(12) United States Patent
Moore et al.

(10) Patent No.: US 11,823,121 B2
(45) Date of Patent: Nov. 21, 2023

(54) SYSTEMS AND METHODS FOR PROCESSING, SECURING, AND COMMUNICATING INDUSTRIAL COMMERCE TRANSACTIONS

(71) Applicant: Inxeption Corporation, South San Francisco, CA (US)

(72) Inventors: Mark Moore, Burlingame, CA (US); Quan Wang, Foster City, CA (US); Jacob Throgmorton, Foster City, CA (US); Kevin Wong, Los Altos, CA (US)

(73) Assignee: Inxeption Corporation, South San Francisco, CA (US)

( * ) Notice: Subject to any disclaimer, the term of this patent is extended or adjusted under 35 U.S.C. 154(b) by 0 days.

(21) Appl. No.: 16/859,703

(22) Filed: Apr. 27, 2020

(65) Prior Publication Data
US 2020/0342394 A1  Oct. 29, 2020

Related U.S. Application Data

(60) Provisional application No. 62/838,482, filed on Apr. 25, 2019.

(51) Int. Cl.
*G06Q 10/087* (2023.01)
*G06F 16/182* (2019.01)
(Continued)

(52) U.S. Cl.
CPC ....... *G06Q 10/087* (2013.01); *G06F 16/1837* (2019.01); *G06Q 20/0658* (2013.01); *G06Q 10/0633* (2013.01)

(58) Field of Classification Search
CPC ............. G06Q 10/087; G06Q 20/3827; G06Q 20/0658; G06Q 10/0633; G06Q 20/0655;
(Continued)

(56) References Cited

U.S. PATENT DOCUMENTS

2005/0289023 A1* 12/2005 Hahn-Carlson ........ G06Q 40/02
705/30
2017/0286717 A1* 10/2017 Khi ..................... G06F 21/6245
(Continued)

FOREIGN PATENT DOCUMENTS

WO        2019010065 A1   1/2019
WO    WO 2019/010065 A1   1/2019
(Continued)

OTHER PUBLICATIONS

WIPO Application No. PCT/US2020/030105, International Search Report and Written Opinion of the International Searching Authority, dated Jul. 16, 2020.
(Continued)

*Primary Examiner* — Peter Ludwig
*Assistant Examiner* — Avia Salman
(74) *Attorney, Agent, or Firm* — Gray Ice Higdon

(57) ABSTRACT

Methods, systems, apparatus, and computer program products related to a digital business management system for business transactions are provided. In an example embodiment, the digital business management system includes receiving a transaction data object generated as a part of a transaction event executed via an external commerce channel to be posted to a ledger, wherein the transaction data object comprises one or more metadata tags classifying the transaction event. The system further comprises generating an immutable ledger entry, parsing the transaction data object to identify the one or more metadata tags for storage in association with the transaction event, identifying a match between the one or more metadata tags received from the external commerce channel and one or more master metadata tags stored in the ledger and associated with a data object profile, and updating the data object profile by associating the immutable ledger entry with the data object profile.

14 Claims, 16 Drawing Sheets

(51) Int. Cl.
*G06Q 20/06* (2012.01)
*G06Q 10/0633* (2023.01)

(58) Field of Classification Search
CPC ............ G06Q 20/203; G06Q 20/3674; G06Q 20/38215; G06Q 20/389; H04L 9/0637; H04L 9/0643; H04L 9/3236; H04L 9/3239; H04L 9/3242; H04L 2209/38; H04L 9/50; H04L 63/102; H04L 2463/102; G06F 9/451; G06F 16/1837
See application file for complete search history.

(56) References Cited

U.S. PATENT DOCUMENTS

| | | | |
|---|---|---|---|
| 2018/0053161 A1 | 2/2018 | Bordash | |
| 2018/0096163 A1* | 4/2018 | Jacques de Kadt | ... G06Q 40/02 |
| 2018/0240112 A1* | 8/2018 | Castinado | ............ G06Q 20/065 |
| 2018/0330412 A1* | 11/2018 | Fredriksson | ........... G06Q 30/04 |
| 2019/0066065 A1 | 2/2019 | Wright | |
| 2019/0114182 A1 | 4/2019 | Chalakudi | |

FOREIGN PATENT DOCUMENTS

| | | |
|---|---|---|
| WO | 2019060395 A1 | 3/2019 |
| WO | WO 2019/060395 A1 | 3/2019 |

OTHER PUBLICATIONS

European Patent Office; Extended European Search Report issued in Application No. 20795073.4, 8 pages, dated Dec. 12, 2022.
Lopez-Pintado Orlenys et al.; "Caterpillar: A Blockchain-Based Business Process Management System," Proceeding of the BPM Demo Track and BPM Dissertation Award Co-Located with 15th International Conference on Business Process Modeling, vol. 1920, Sep. 10, 2017, pp. 1-5, XP093001264, Retrieved from: URL: https://ceur-ws.org/Vol-1920/BPM_2017_paper_199.pdf Sep. 10, 2017.

* cited by examiner

FIG. 12

SYSTEMS AND METHODS FOR PROCESSING, SECURING, AND COMMUNICATING INDUSTRIAL COMMERCE TRANSACTIONS

CROSS-REFERENCE TO RELATED APPLICATIONS

This application claims priority to U.S. Provisional Application No. 62/838,482 filed Apr. 25, 2019, which is hereby incorporated herein in its entirety by reference.

BACKGROUND

Industrial commerce Business to Business (B2B) interactions relate to transactions conducted between business entities, rather than between a business and individual consumer. Examples of industrial commerce B2B interactions include sales, marketing, purchase order, shipping, payment, vendor relationships, manufacturer and wholesaler relationships, wholesaler and retailer relationships. Accordingly, industrial commerce B2B is a business model that focuses on selling products and/or services to other business entities in the business to consumer chain. Inherent characteristics of industrial commerce B2B transactional relationships often frustrates seller marketing efforts to attract new customers in an industrial commerce B2B transaction environment, and therefore technological improvements are constantly needed to address the changing needs of B2B systems.

BRIEF SUMMARY

Various embodiments of the present disclosure are directed to computer implemented methods, apparatuses, systems, and computer program products for providing product tracking and product transaction verification, via a distributed product ledger within an industrial commerce B2B environment. In accordance with one aspect, a method is provided. In one embodiment, the method comprises receiving, at a hub and via a communication application program interface, a transaction data object generated as a part of a transaction event executed via an external commerce channel of one or more external commerce channels to be posted to a ledger, wherein the transaction data object comprises one or more metadata tags classifying the transaction event. The method further comprises generating an immutable ledger entry based at least in part on the transaction data object, parsing the transaction data object to identify the one or more metadata tags for storage in association with the transaction event, identifying a match between the one or more metadata tags received from the external commerce channel and one or more master metadata tags stored in the ledger and associated with a data object profile, and updating the data object profile associated with the one or more master metadata tags at least in part by associating the immutable ledger entry with the data object profile.

In accordance with another aspect, a computer program product is provided. The computer program product may comprise non-transitory computer readable medium having computer program instructions stored therein, the computer program instructions when executed by a processor, cause the processor to receive, at a hub and via a communication application program interface, a transaction data object generated as a part of a transaction event executed via an external commerce channel of one or more external commerce channels to be posted to a ledger, wherein the transaction data object comprises one or more metadata tags classifying the transaction event. The computer program instructions when executed by a processor, further cause the processor to generate an immutable ledger entry based at least in part on the transaction data object, parse the transaction data object to identify the one or more metadata tags for storage in association with the transaction event, identify a match between the one or more metadata tags received from the external commerce channel and one or more master metadata tags stored in the ledger and associated with a data object profile, and update the data object profile associated with the one or more master metadata tags at least in part by associating the immutable ledger entry with the data object profile.

In accordance with yet another aspect, a digital business management system is provided. The digital business management system comprising a non-transitory computer readable storage medium defining a ledger and one or more processors and configured to receive, at a hub and via a communication application program interface, a transaction data object generated as a part of a transaction event executed via an external commerce channel of one or more external commerce channels to be posted to the ledger, wherein the transaction data object comprises one or more metadata tags classifying the transaction event. The digital business management system is further configured to generate an immutable ledger entry based at least in part on the transaction data object, parse the transaction data object to identify the one or more metadata tags for storage in association with the transaction event, identify a match between the one or more metadata tags received from the external commerce channel and one or more master metadata tags stored in the ledger and associated with a data object profile, and update the data object profile associated with the one or more master metadata tags at least in part by associating the immutable ledger entry with the data object profile.

BRIEF DESCRIPTION OF THE SEVERAL VIEWS OF THE DRAWINGS

Reference will now be made to the accompanying drawings, which are not necessarily drawn to scale, and wherein:

FIG. 12 illustrates an example signal protocol structured in accordance with some embodiments discussed herein;

DESCRIPTION

Figure 1:
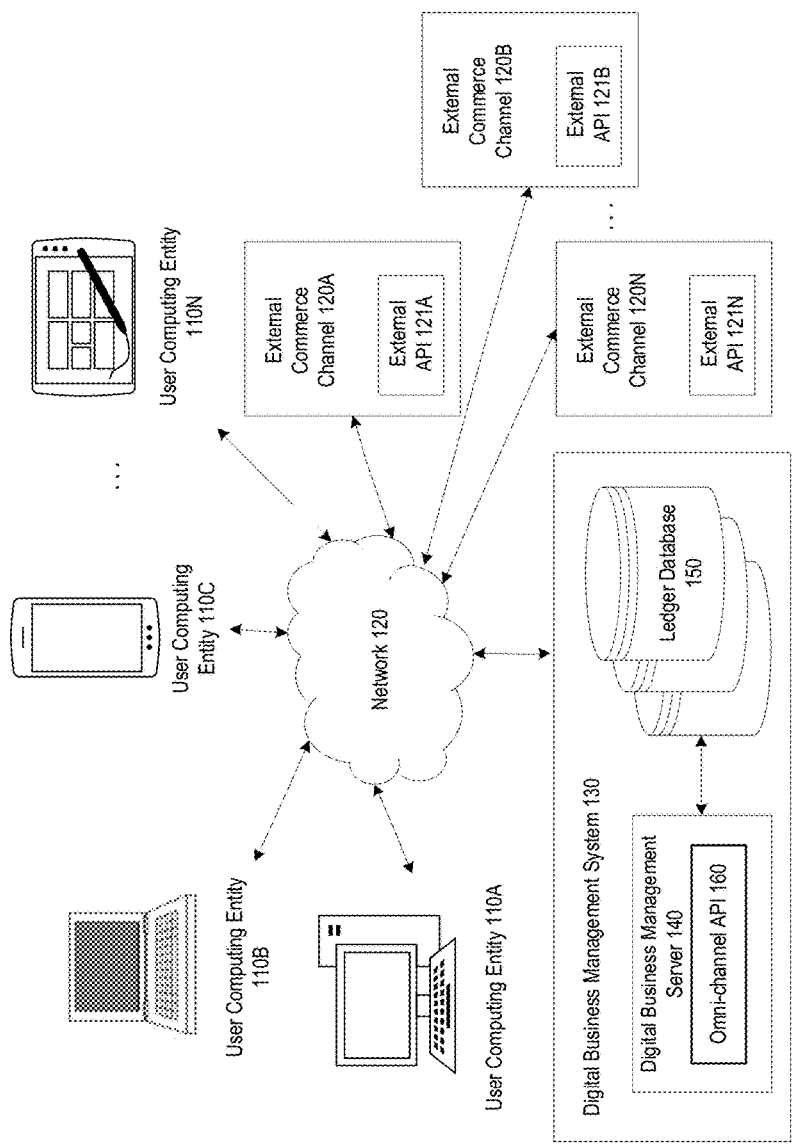
FIG. 1 is an overview of a system that can be used to practice embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

As used herein, the terms "industrial commerce B2B," "iCommerce B2B," and similar terms may be used interchangeably to refer to a system capable of providing business entities a platform for complete electronic commerce transactions and solutions related to product definition, product setup, marketing, payment, and shipment in accordance with embodiments of the present disclosure.

In general, embodiments of the present disclosure provide methods, apparatuses, systems, computing devices, and/or the like that are configured for providing, via a distributed product ledger and decentralized identity verification protocols, product order tracking and product ownership security to establish, preserve, and validate ownership rights and product information within an industrial commerce B2B environment. Such embodiments provide an immutable establishment of authenticity that verifies the authenticity and validity of any actions and transactions by B2B users.

I. Overview

Industrial commerce B2B is a rapidly growing area of the iCommerce B2B industry, which makes it an increasingly common target for security threats (e.g., attempted hacking to gain unauthorized access) and without adequate security/authentication, hackers may obtain unauthorized access to B2B users' accounts, leak order histories and payment details, and even disable accounts. To combat these security threats, various embodiments incorporate verification identity configurations to ensure only authorized users can successfully gain access to user-specific accounts. By first verifying the identity of the B2B user, embodiments of the present invention are able to better protect iCommerce B2B assets. In some embodiments, verifying the identity of the B2B user, for example, through the B2B user's own digital identification and security identification tokens reflected on a distributed ledger may also be utilized for authentication.

Conventional iCommerce B2B platforms utilize single-sign-on systems for electronic account access for most every iCommerce B2B transaction. Most common, a username and password are required, but have been found to be very easy to hack. Conventional two-factor authentication may help, but provides a great deal of user-system interface friction—conventional two-factor authentication requires B2B users to wait for a security code and then input the security code before having access to their accounts. Moreover, the movement of order and payment information between multiple parties complicates transactions, which can delay payments and disrupt the reconciliation process.

Embodiments of the present invention provide security that is at least as strong as of two-factor authentication but having reduced friction points for B2B users that handle high-value, high-volume orders that involve multiple layers of suppliers and distributors built on a decentralized blockchain technology. Other embodiments combine the process of frictionless two-factor authentication with one or both a biometric input (e.g., a fingerprint, retinal scan, or the like) and security identification token, to authenticate both the B2B user device and one or both possession thereof before, for example, pushing a payment or allowing access to one's account. Another embodiment of the present invention provides for a digital wallet having secure, surrogate payment data called payment tokens to be used for various transactions (e.g., buying and selling of goods and/or services).

Certain embodiments provide for configurations for maintaining an industrial ecommerce website, including configurations for uploading and marketing new products (or new details of existing products), and fulfilling an order. For example, a B2B user is placing a new product or service online via an iCommerce B2B platform according to various embodiments. The iCommerce B2B platform may utilize blockchain technology, wherein each step in the process (product upload, placement, payment, fulfillment, shipping, and delivery) adds a new block to the chain with the time that the action was performed. In this regard, disputes regarding payment or order details are less likely to occur due to the decentralized, tamper-proof nature of the blockchain-based ledger as the ledger operates as a transparent and public record of all transactions (the data within the ledger being sufficiently encrypted to avoid unauthorized access). The present invention further provides for a day-to-day maintenance of iCommerce B2B stores with multi country channels as well as facilitating cross-border transactions.

Various embodiments provide for automatically monitoring and recording data indicative of each digital interaction of a business and their products, including transactional data, product details, delivery details, payment details, product provenance, buyer information, etc. in a ledger (e.g., an immutable ledger) reflected within a secure electronic storage environment configured in accordance with Blockchain storage methodologies. Businesses can selectively share such data with customers and/or partners to determine a most cost-effective contract or marketing strategy. In certain embodiments, at least a portion of a vendor's product details may be selectably shared via an electronic marketplace populated with pre-vetted vendors, with the opportunity to price products differently for different audiences. In certain embodiments, this product information may be additionally provided to a plurality of other (e.g., external) sales channels (e.g., that may be managed by third parties, such as Amazon.com, eBay™, Etsy™, Shopify™, and/or the like) while maintaining a centralized repository and dashboard configuration for managing the multiple sales channels (e.g., Amazon.com, eBay™, Etsy™, Shopify™, etc.) in a single dashboard. Moreover, certain embodiments may encompass a credit management module to analyze business data stored within an immutable blockchain ledger and associated with a particular business to determine the business's creditworthiness and may generate a loan business plan based on the business's creditworthiness.

A. Technical Problem

Industrial commerce or iCommerce involving technical, industrial, and manufacturing businesses require more complex functionality from an e-commerce platform than a business-to-consumer (B2C). Example complex functionalities these businesses require include streamlining complex logistics and providing a verifiable history of transactions and provenance of materials, ingredients, or goods. At least one technical challenge is the ability to transfer product information from one commerce system or platform to another commerce system. The lack of proper integration of different commerce systems can cause mis-synchronization of metadata because different commerce platforms present data objects and metadata at different fragments, levels, types, and granularities. Capturing such data is computationally burdensome and time consuming. Another problem is secure provenance in systems since data is easily modifiable and there is no inherent implementations related to authenticating the history of data stored in systems. Additionally, many electronic commerce systems are configured to provide security against unauthorized access by third parties unrelated to a business and/or a hosting entity. However, many existing systems are configured such that representatives of a hosting service are considered trusted individuals having nearly unencumbered access to data of the business, even though such individuals are otherwise unrelated to the business. Thus, in particular business relationships, the hosting service may directly or indirectly compete with businesses that are hosted by its services. Businesses have tolerated such relationships because the hosting services may be provided in a Software as a Service (SaaS) configuration, in which technical and business assistance requires some level of access by the hosting service representatives. Details such as the business's inventory, transactions, negotiations, contract details, etc. may be easily accessible to the hosting entity due to the hosting relationship of existing services. Additionally, such systems generate a large amount of business data including transactions, purchasing of materials, manufacturing, marketing, distributing products, and product sales. The complexity and volume of data may often make it impractical or impossible for a system, let alone individual businesses to manage and understand, thus may not illuminate transaction opportunities.

B. Technical Solution

To solve the foregoing technical problems while protecting the privacy of businesses, an exemplary embodiment of the present invention provides a product-centric ledger as a portion of a digital business management system architecture provided via an immutable ledger, such as blockchain. Data stored within the immutable ledger may be encrypted and accessible only to those computing devices and/or individuals authorized for access to the underlying data. The product-centric ledger approach creates a platform that overcomes many challenging competitive threats businesses face when they try to sell online. The digital business management system provides a standalone digital marketplace enabling businesses to facilitate management of various sales channels while maintaining control and privacy of their own data. Further, the digital business management system allows businesses to deploy and monitor their data through a single dashboard screen. In the iCommerce environment, data about a business's product or service may be available for sale in a plurality of disparate commerce channels (e.g., Amazon.com, eBay™, Etsy™, Shopify™, etc.). The digital business management system is configured to integrate data from the various commerce channels into a single data store to enable businesses to track sales of products from the multiple channels, provide product-specific data automatically for reproduction in the multiple channels, maintain an open line of communication tied to a specific product, and various processes related to consolidating and syncing product data. Additionally, data stored in the ledger may be useful in gauging a credit worthiness of business to provide loans or credit agreements facilitated through the digital business management system.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing entities, computing entities, and/or the like. As such, embodiments of the present invention may take the form of an apparatus, system, computing entity, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an illustration of an exemplary embodiment of the present invention. FIG. 1 shows system 100 including an example network architecture for a system, which may include one or more devices and sub-systems that are configured to implement some embodiments discussed herein. As shown in FIG. 1, the system 100 may comprise a digital business management system 130, one or more user computing entities 110A-110N, one or more networks 120, one or more external commerce channels 120A-120N each comprising external APIs (application programming interfaces) 121A-121N, respectively. Each of the components of the system may be in electronic communication with, for example, one another over the same or different wireless or wired networks as discussed herein.

In the example illustrated embodiment of FIG. 1, the digital business management system 130 may include digital business management server 140 and a plurality of ledger databases 150, which can be embodied as a part of, for example, circuitry 200 and/or database, among other devices (not shown). In some embodiments, the digital business management system 130 may generate a data object associated with a product or service for sale in an industrial internet iCommerce marketplace provided by the digital business management system 130. Data objects are stored via a ledger database 150 (shown in FIG. 1) which may be stored as a part of and/or in communication with one or more user computing entities 110A-110N and/or the digital business management system 130. The ledger database 150 may further include information accessed and stored by the one or more user computing entities 110A-110N to facilitate the digital business management system 130.

Digital business management system 130 can communicate with one or more user computing entities 110A-110N, one or more external commerce channels 120A-120N, and/or other computing entities via network 120, and a plurality of user computing entities 110A-110N may communicate with one another, and/or other computing entities such as the one or more external commerce channels 120A-120N, via the network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 120 may include a cellular telephone, an 802.11, 802.16, 802.20, and/or WiMax network. Further, the network 120 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel. In some embodiments, the protocol is JSON over RPC, JSON over REST/HTTP, and the like.

The digital business management server 140 may be embodied as a computer or group of computers. The digital business management server 140 may provide for receiving of electronic data from various sources, including but not necessarily limited to the user computing entities 110A-110N. For example, the digital business management server 140 may be operable to receive and manage data objects associated with products provided by the user computing entities 110A-110N.

In an example embodiment, the digital business management system 130 can serve as a trusted repository that stores a business/user profile of a business account and a plurality of product profiles provided by the business account. The business profile is a data object comprising an electronic collection of information associated with a business such as, for example, activity information related to buying and/or selling products or services. In an embodiment, such information may include, but is not limited to, business name, business type, biometric information in addition to other user-related data (e.g., user's fingerprint scanner or user computing entity 110A includes unique markings or scratches), geographical information, language(s) to be used, currency to be used, bank account information, partnerships, customers, products and/or services offered, and so forth. For example, the digital business management system 130 records and stores business account activities related to buying and/or selling products or services to transaction records represented in ledger database 150.

The product profile is a data object comprising an electronic record of information associated with a product, for example, product activity information related to sales and marketing, management, manufacturing, customer service, and financial analytics. Sales and marking may include monitoring leads and online ad spend, cost-per-click, overall marketing spend and marketing ROI (return on investment) rates per specific product. Product management may include real time interaction with customer and prospects to create new products, new options, and updated specifications. Manufacturing may include management of onsite and third party manufacturing partners and supply chain management. Customer service include shipping, order verification, product-based customer service and support, and product-based net promoter score and finally, financial analytics provides product margins and product revenue.

The digital business management system 130 provides an immutable record of transactions, secure product provenance, and product sale tracking and integration through one or more sales channels. With regards to providing an immutable record of transactions, the digital management system 130 includes a ledger database 150 embodied as an immutable ledger storing data regarding executed transactions. The ledger database 150 is immutable which gives confidence that a product can be validated by looking up events in the ledger related to the particular product. In some embodiments, blockchain technology is utilized to provide an immutable record of the business activities and product transactions. A blockchain is a transaction database shared by all entities participating in the digital business management system 130. The blockchain contains every transaction and activity ever executed. Such an embodiment ensures that the immutable ledger maintains data of one or more transactions, such that businesses are provided with a sense of security that information relating to executed orders is properly stored for later reference. Such immutable record of prior transactions ensures detailed information regarding such orders that may arise during customized orders, negotiations, instructions, and requests that are constantly being passed between businesses when finalizing a transaction.

In some embodiments, the digital business management system 130 provides secure product provenance and backward traceability of parts of products. This includes information associated with the products' parts such as, for example, processes used to generate parts, materials used to form parts, and/or requirements that parts need to meet (e.g., safety regulations, compliance, etc.). Moreover, a record entry is provided and stored within an immutable record for each and every product part status at each stage of the production and order fulfillment lifecycle, thereby providing a complete product provenance enabling each product to be traced to its source. For example, the digital business management system 130 uses the ledger database to track sales of a product all over the globe, track who manufactured the product, and in the event the product is recalled, the digital business management system 130 provides the business with information on which product batches are affected and who bought them. The digital business management system 130 further provides means for tracking product sales originating from different sales channels. The digital business management system 130 provides information on types of products sold by the various sales channels, inventory information, lead information, and various other sales or marketing related information.

In some embodiments, ledger database 150 may be maintained in a distributed manner as a blockchain. The blockchain keeps track of all transactions that occur within the digital business management system 130. The blockchain also keeps track of transactions related to products managed by the digital business management system 130 but occurring external to the digital business management system 130 (e.g., transactions occurring within the one or more external commerce channels 120A-120N). In certain embodiments, a single blockchain may be utilized for storing a plurality of data types, such as transaction records, business profiles, product provenance data, and/or the like. In other embodiments, a plurality of blockchains may be utilized, each blockchain storing different data types.

As used herein, a ledger refers to a ledger system comprising data objects (e.g., product data objects, profile data objects, etc.) by which access to the ledger and the data objects is restricted based on one or more encryption keys and/or one or more security tokens. Access to the product data objects, data within the product data objects, transaction information, associated metadata, or the ledger itself may be restricted by only sending data to those businesses who should have it and not sending data to those businesses who should not have it.

User computing entities 110A-110N and/or digital business management system 130 may each be implemented as one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The depiction in FIG. 1 of "N" user computing entities is merely for illustration purposes. Any number of users and/or user computing entities 110A-110N may be included in the system for accessing and/or implementing aspects of the digital business management system 130 discussed herein (e.g., via one or more interfaces). In one embodiment, the user computing entities 110A-110N may be configured to display or provide digital business management system interface on a display of the user computing entity for viewing, creating, editing, and/or otherwise interacting with one or more data objects (e.g., products), which may be provided or pushed by the digital business management system 130 (and any transactions related to the data object may be stored by ledger database 150). According to some embodiments, the digital business management system 130 may be configured to cause display or presentation of an interface for viewing, creating, editing, and/or otherwise interacting with one or more data objects.

As indicated above, the user computing entities 110A-110N may be any computing entity as defined above. Electronic data received by the digital business management system 130 from the user computing entities 110A-110N may be provided in various forms and via various methods. For example, the user computing entities 110A-110N may include desktop computers, laptop computers, smartphones, netbooks, tablet computers, wearables, and the like. In embodiments where a user computing entity 110A-110N is a mobile device, such as a smart phone or tablet, the user computing entity 110A-110N may execute an "app" such as the digital business management application to interact with the digital business management system 130. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the user computing entities 110A-110N may interact with the digital business management system 130 via a web browser. In some embodiments of an exemplary digital business management system 130, a message, signal, or messaging communication may be sent from user computing entity 110A to a digital business management server 140. In various implementations, the message may be transmitted to the digital business management system 130 over network 120 directly by user computing entities 110A-110N, the message may be transmitted to the digital business management system 130 via an intermediary such as a message server, and/or the like. For example, the user computing entity 110A may be a desktop, a laptop, a tablet, a smartphone, and/or the like that is executing a client commerce channel application (e.g., Shopify™ app). In one implementation, the message may include transaction data such as a data object profile identifier, transaction data contents (e.g., purchase order, inventory count, etc.), attachments (e.g., files), metadata tags, and/or the like. In one embodiment, the digital business management server 140 may provide a message, substantially in the form of a security signal protocol fragment data, as provided in FIG. 12. Each fragment data includes at least a description, a universal unique identifier (UUID), a name, and a transaction identifier. Each fragment can include additional data indicative of artifacts of digital business management system 130.

In some embodiments, the user computing entities 110A-110N and/or the digital business management server 140 will access and communicate with one or more external commerce channels 120A-120N through network 120. In some examples, external commerce channels 120A-120N may include Amazon.com, eBay™, Etsy™, Shopify™ and the like. The one or more external commerce channels 120A-120N are separate network entities from the digital business management system 130. Communication with the one or more external commerce channels 120A-120N is typically provided via APIs 121A-121N provided by the external commerce channels 120A-120N as depicted in FIG. 1. In various embodiments, the APIs 121A-121N define the protocol and procedural steps by which external commerce channels 120A-120N may make transaction data objects available for access/ingestion by the digital business management system 130.

The external commerce channels 120A-120N provide online commerce services via one or more external calendar applications accessed over the network 120 such as for selling products, managing orders, inventory, payments, and shipping.

An omni-channel API 160 of the digital business management server 140 facilitates sharing of external transaction data objects among and between the digital business management system 130 and the external commerce channels 120A-120N. The omni-channel API 160 further defines the security and authentication protocols that govern communications between the external commerce channels 120A-120N and the digital business management system 130. In various embodiments, the omni-channel API 160 comprises all or part of the API handler circuitry 217 discussed in connection with FIG. 2. For example, the omni-channel API 160 interfaces with the external commerce channels 120A-120N to receive transaction events. The external commerce channels 120A-120N generate transaction events regarding product activity within each of the external commerce channels 120A-120N. In some embodiments, the digital business management system 130 registers with each of the external commerce channels 120A-120N to receive certain transaction events comprising transaction data objects. In this case, when a transaction event of a certain type for which the digital business management system 130 registered occurs at one or more of the external commerce channels 120A-120N, the one or more external commerce channels 120A-120N transmits or forwards the transaction event to the digital business management system 130 via one or more of the external APIs 121A-121N.

In some embodiments, the digital business management system 130 facilitates the purchase and delivery of products anytime and anywhere. The digital business management system 130 may use any of the algorithms, operations, steps, and processes disclosed herein to provide a secure, seamless, and omni-channel product management system that enables continuous product management across multiple channels (e.g., external commerce channels 120A-120N). Thus, the digital business management system 130 is configured to manage the entire product generation-to-fulfillment as a chain of related transactions, handled via a single dashboard.

Moreover, the digital business management system 130 is configured such that product transactions from one or more external commerce channels 120A-120N can be tracked and managed via a single dashboard, with providing product-specific data automatically for reproduction in the disparate sales channels and maintaining an open line of communication tied to the specific product to streamline and simplify selling through various sales channels as well as pricing and marketing the specific product differently in each sales channel.

In some embodiments, the digital business management system 130 may include a hub or iCommerce network hub acting as a center for receiving and processing transaction and account information such as for example, transaction information related to product ordering, selling, buying, marketing, etc. The account information may include information related to security tokens, analytics, creditworthiness, account authentication, etc. The iCommerce network hub may employ rules and/or constraints to protect data and ensure data consistency and serve as a central authority facilitating control over transactions and data integrity of ledger databases 150 and its records. The iCommerce network hub is a centralized, digital hub for product and customer data, they allow eCommerce businesses to perform actions such as customize product information, manage web content and layout, allow online transactions to occur, and adjust the platform according to businesses' online needs by providing appropriate user input via corresponding user interfaces. eCommerce platforms unify, scale, and maintain core business processes like the front-facing selling of products and services, and the back-end functions of managing inventory and customer order history.

Figure 4:
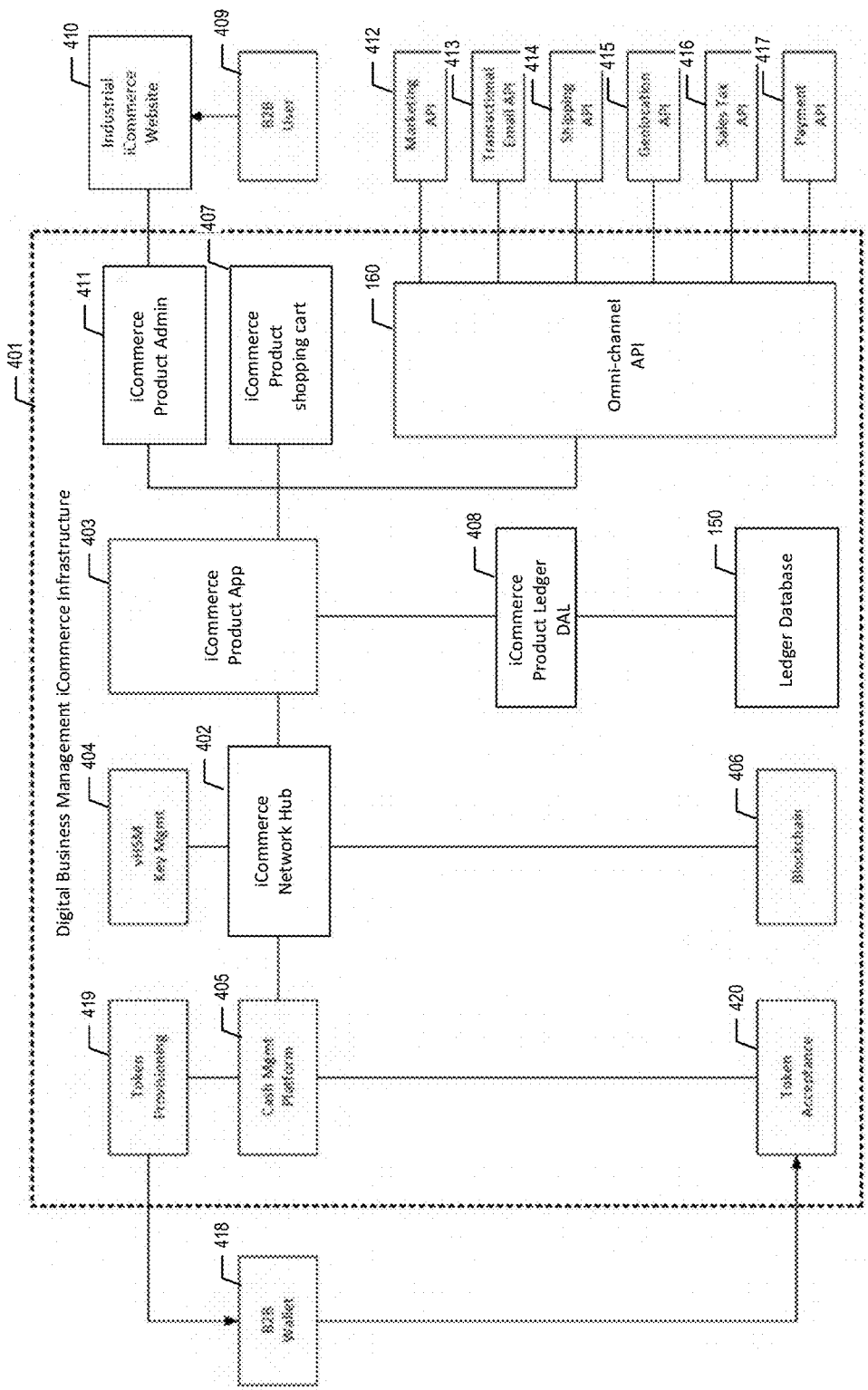
FIG. 4 is an overview of a system that can be used to practice embodiments of the present invention.

FIG. 4 illustrates an example digital business management iCommerce infrastructure platform 400 comprising a digital business management iCommerce infrastructure 401. The digital business management iCommerce infrastructure 401 represents the software environment supporting the intended business functionality for the selected various service offerings. The digital business management iCommerce infrastructure 401 includes an iCommerce network hub 402 that is connected to a plurality of applications, services, and platforms including, for example, iCommerce product application (app) 403, virtual hardware security module (vHSM) key management 404, cash management platform 405, and blockchain 406.

Figure 2:
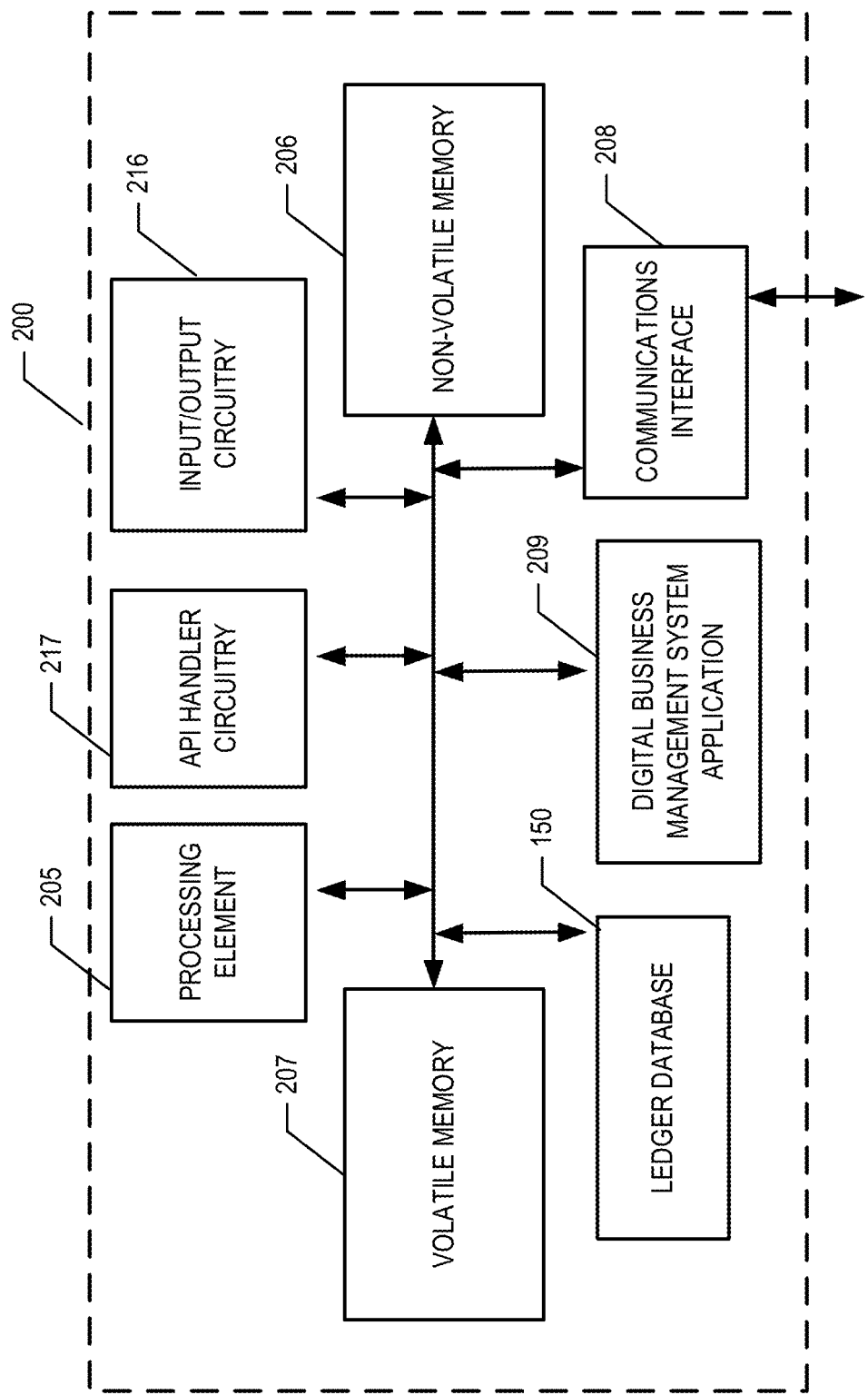
FIG. 2 illustrates an example server in accordance with some embodiments discussed herein.

The iCommerce product app 403 in combination with one or more of the iCommerce product shopping cart 407 and the iCommerce product ledger data access layer (DAL) 408 is configured to enable a business-to-business (B2B) user 409 (e.g., business) to upload a new product for sale, for example, via an industrial iCommerce website 410. In some embodiments, the digital business management iCommerce infrastructure 401 further comprises an iCommerce product administration (admin) 411 that may be configured to facilitate authorizing B2B users 409 access to the digital business management iCommerce infrastructure 401. Additionally, the iCommerce product admin 411 may be configured to facilitate authentication of the B2B user 409 prior to uploading the product to the iCommerce product app 403. In another example embodiment, the iCommerce product admin 411 utilizes a specifically configured omni-channel API 160 to ingest or receive external transaction data objects. The omni-channel API 160 comprising API handler circuitry 217 of FIG. 2 is operable to handle the various API calls 412-417 (e.g., marketing API 412, transactional email API 413, shipping API 414, geolocation API 415, sales tax API 416, and payment API 417) from the one or more external commerce channels 120A-120N. Moreover, the omnichannel API is configured to extract various data elements from the one or more external commerce channels 120A-120N, thereby enabling generation of a product profile comprising data indicative of a plurality of product sales channels. In some embodiments, the iCommerce product admin 411 may be configured to add or remove products or B2B user accounts and/or webstores on the industrial e-commerce website.

In some embodiments, the iCommerce product shopping cart 407 is a sophisticated shopping cart that includes programming logic to support, manage, and facilitate purchase orders, financing, and other capabilities. In particular, capabilities such as the ability to accept recurring payments, sign contracts, and pay via financing. In another example embodiment, the iCommerce product shopping cart 407 may further facilitate price negotiations in that there may be pricing considerations for businesses (e.g., buyers) whose orders tend to be large and wholesale. As such, the iCommerce product shopping cart 407 is configured to cater to how buyers pay by offering tiered pricing, quotes, and/or promotions.

The iCommerce product app 403 uses the iCommerce product ledger DAL 408 to return datasets from the ledger database 150 that comprises metadata about product(s) and/or account(s) that are entitled to the B2B user 409. In some embodiments, the datasets must meet certain criteria such as: the datasets are not older than a defined age (e.g., three days), the datasets must be associated with a unique identifier, the datasets must be a specific data type, etc.

In some embodiments, the iCommerce network hub 402 utilizes blockchain 406 in various ways to facilitate data transactions. The iCommerce network hub 402 utilizes blockchain 406, vHSM key management 404, and cash management platform 405 to provide a secure framework for buying, selling, shipping, and recording data transactions. In an example embodiment, when the B2B user 409 desires to list, sell, buy, or trade a product or service, the user's B2B wallet 418 may provide access to the digital business management iCommerce infrastructure 401 by utilizing specialized cryptographic keys, tokens, tokenization protocols which are employed and/or configured to update the ledger database 150 and exchange payment tokens among B2B wallets 418 in order to facilitate buying, selling, trading, and authenticating products. In some embodiments, the iCommerce network hub 402 utilizing blockchain 406, and the vHSM key management 404, and cash management platform 405 may support credit payment systems and cash payment systems. The platform converts the plurality of financial instruments (e.g., cash, credit, check, money order, coupons, virtual currency, etc.) into payment tokens that can be exchanged among the B2B users 409 B2B wallets 418 based on transactions recorded on the ledger. These virtual payment tokens may be associated with an existing account (e.g., a bank account). The payment tokens may be associated and/or customized based on various identifying information, product information and/or circumstantial information associated with the provisioning of the payment token or the B2B user 409 reputation. In another example embodiment, security or trust tokens may be used to track B2B accounts, transactions, and assets using blockchain 406 and ledger database 150.

In this case, the cash management platform 405 may be configured to request initiation of an authentication process to validate and authenticate the identity of the B2B user 409 before token provisioning 419 and token acceptance 420 processes may be initiated. In this regard, the vHSM key management 404 provides the generation, exchange, storage, use, and replacement of encryption keys used to encrypt data. As further discussed herein, the vHSM key management 404 is configured to generate one or more cryptographic keys used to encrypt and decrypt data.

In some embodiments, the digital business management iCommerce infrastructure 401 is configured to receive decentralized product information from the B2B user 409 via the industrial iCommerce website 410, store the product information as product data object via the iCommerce product ledger DAL 408 to the ledger database 150, and manage and secure the product data object using the iCommerce product app 403. In an example embodiment, receiving the product information from the B2B user 409 may comprise enabling B2B users 409 to upload product images and product information to the industrial iCommerce website 410 in connection with the digital business management iCommerce infrastructure 401. Because of the decentralized nature of the digital business management iCommerce infrastructure 401, product ledger information is stored in cloud memory by authentication tokenization.

In some examples, the iCommerce product app 403 may store the product images and product information in the ledger database 150 using the iCommerce product ledger DAL 408 which acts as a logical entity between the iCommerce product app 403 and the ledger database 150. In some examples, the ledger database 150 may also comprises a variety of additional product data representative of transaction history. For example, the ledger database 150 may comprise data related to payment information, transactions, refunds, expirations, statistics, and/or other data. Alternatively, or additionally, the ledger database 150 may comprise data that is suggestive of shipping efficiency metrics, marketing campaigns, and the like. In some examples, shipping and delivery of products may be monitored at least in part via the iCommerce product shopping cart 407, for example, the iCommerce product shopping cart 407 may transmit a notification of delivery and receipt of products.

Each of these components, entities, devices, systems, and similar words used herein interchangeably may be in direct or indirect communication with, for example, one another over the same or different wired or wireless networks. Additionally, while FIG. 4 illustrates the various system entities as separate, standalone entities, the various embodiments are not limited to this particular architecture.

A. Exemplary Circuitry of Digital Business Management System

FIG. 2 provides a schematic of circuitry 200, some or all of which may be included in, for example, digital business management system 130 and/or user computing entities 110A-110N. Any of the aforementioned systems or devices may include the circuitry 200 and may be configured to, either independently or jointly with other devices in a network 120 perform the functions of the circuitry 200 described herein. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As illustrated in FIG. 2, in accordance with some example embodiments, circuitry 200 can includes various means, such as processing element 205, volatile memory 207, non-volatile memory 206, communications interface 208, ledger database 150, digital business management system application 209, and/or input/output circuitry 216. As referred to herein, "circuitry" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., non-volatile memory 206) that is executable by a suitably configured processing device (e.g., processing element 205), or some combination thereof.

Input/output circuitry 216 may be in communication with processing element 205 to receive an indication of a user input and/or to provide an audible, visual, mechanical, or other output to a user (e.g., provider and/or consumer). As such, input/output circuitry 216 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output circuitry 216 may be reduced as compared to embodiments where circuitry 200 is implemented as an end-user machine (e.g., consumer device and/or provider device) or other type of device designed for complex user interactions. In some embodiments (like other components discussed herein), input/output circuitry 216 may even be eliminated from circuitry 200. Alternatively, such as in embodiments wherein circuitry 200 is embodied as a server or database, at least some aspects of input/output circuitry 216 may be embodied on an apparatus used by a user that is in communication with circuitry 200. Input/output circuitry 216 may be in communication with the volatile memory 207, non-volatile memory 206, communications interface 208, and/or any other component(s), such as via a bus. One or more than one input/output circuitry and/or another component can be included in circuitry 200.

Ledger database 150 and digital business management system 130 may also or instead be included and configured to perform the functionality discussed herein. In some embodiments, some or all of the functionality may be performed by processing element 205. In this regard, the example processes and algorithms discussed herein can be performed by at least one processing element 205, ledger database 150, and/or digital business management system 130. For example, non-transitory computer readable media can be configured to store firmware, one or more application programs, and/or other software, which include instructions and other computer-readable program code portions that can be executed to control each processor (e.g., processing element 205, ledger database 150, and/or digital business management system 130) of the components of circuitry 200 to implement various operations, including the examples shown above. As such, a series of computer-readable program code portions are embodied in one or more computer program goods and can be used, with a computing entity, server, and/or other programmable apparatus, to produce machine-implemented processes.

As indicated, in one embodiment, circuitry 200 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the circuitry 200 may communicate with other computing entities, one or more user computing entities 110A-110N, and/or the like.

As shown in FIG. 2, in one embodiment, the circuitry 200 may include or be in communication with one or more processing elements 205 (also referred to as processors, processing circuitry, and/or similar terms used herein interchangeably) that communicate with other elements within the circuitry 200 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the circuitry 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Non-volatile memory 206 may also be embodied as a data storage device or devices, as a separate database server or servers, or as a combination of data storage devices and separate database servers. Further, in some embodiments, non-volatile memory 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the relevancy prediction system may be stored. As a person of ordinary skill in the art would recognize, the information/data required for the operation of the relevancy prediction system may also be partially stored in the cloud data storage system and partially stored in a locally maintained data storage system.

Non-volatile memory 206 may include information/data accessed and stored by the digital business management system 130 to facilitate the operations of the system. More specifically, non-volatile memory 206 may encompass one or more data stores configured to store information/data usable in certain embodiments.

B. Exemplary User Computing Entity

Figure 3:
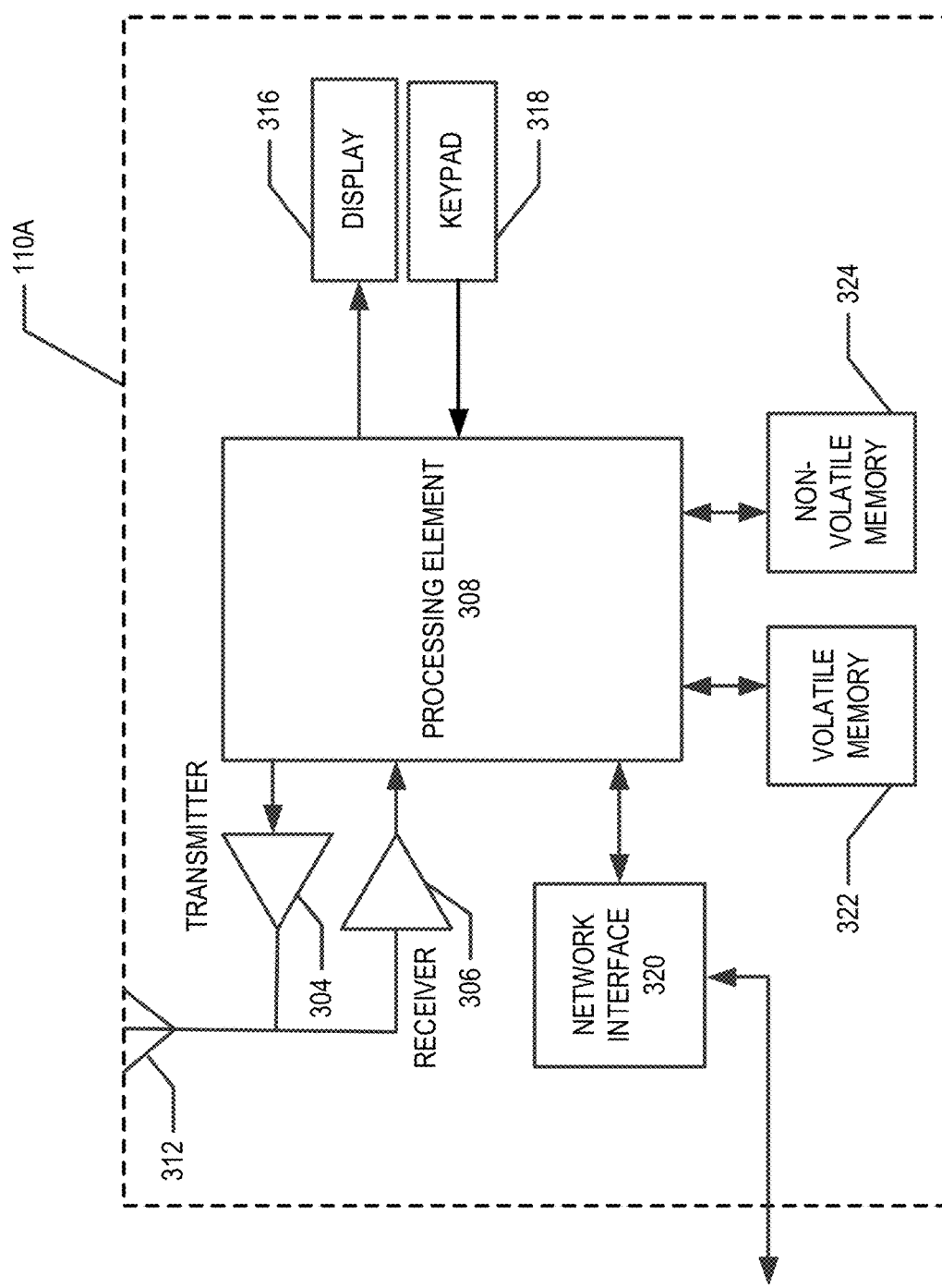
FIG. 3 illustrates an example user computing entity in accordance with some embodiments discussed herein.

FIG. 3 provides an illustrative schematic representative of user computing entity 110A-110N that can be used in conjunction with embodiments of the present invention. As shown in FIG. 3, a user computing entity 110A can include an antenna 312, a transmitter 304 (e.g., radio), a receiver 306 (e.g., radio), network interface 320, and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as an digital business management system 130, another user computing entity 110A, and/or the like. In this regard, the user computing entity 110A may be capable of operating with one or more air interface standards, communication protocols, modulation types, and access types. More particularly, the user computing entity 110A may operate in accordance with any of a number of wireless communication standards and protocols. In a particular embodiment, the user computing entity 110A may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 110A can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110A can also download changes, add-ons, and updates, for instance, to its firmware, software (e.g., including executable instructions, applications, program modules), and operating system.

According to one embodiment, the user computing entity 110A may include location determining aspects, devices, modules, functionalities, and/or similar words used herein interchangeably. For example, the user computing entity 110A may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's position in connection with a variety of other systems, including cellular towers, Wi-Fi access points, and/or the like. Similarly, the user computing entity 110A may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing entities (e.g., smartphones, laptops) and/or the like. For instance, such technologies may include iBeacons, Gimbal proximity beacons, BLE (Bluetooth Low Energy) transmitters, NFC transmitters, and/or the like. These indoor positioning aspects can be used in a variety of settings to determine the location of someone or something to within inches or centimeters.

The user computing entity 110A may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 110A to cause display or audible presentation of information/data and for user interaction therewith via one or more user input interfaces. As just one specific example, the user computing entity 110A may be configured to output various interface screens associated with an digital business management system 130, which may provide various setup/registration screens and/or may provide one or more product order confirmations for a user of the user computing entity 110A. The user input interface can comprise any of a number of devices allowing the user computing entity 110A to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 110A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 110A can collect information/data, user interaction/input, and/or the like.

The user computing entity 110A can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 110A. Again, as a specific example, the user computing entity memory storage areas (encompassing one or both volatile memory 322 and/or non-volatile memory 324) may store the digital business management system application 209 thereon. The memory storage areas discussed herein may further encompass one or more aspects of ledger database 150, as discussed in greater detail herein (however the ledger database 150 may be stored in association with the digital business management system 130 in certain embodiments).

In one embodiment, the digital business management system 130 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the digital business management system 130 with the assistance of the processing element 205 and operating system.

As indicated, in one embodiment, the digital business management system 130 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the digital business management system 130 may communicate with computing entities or communication interfaces of other computing entities, user computing entities 110, and/or the like.

As indicated, in one embodiment, the digital business management system 130 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the digital business management system 130 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The digital business management system 130 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In some embodiments, the user computing entity 110A can also include an embedded-secure element (eSE). It is known to solder or weld a chip (e.g., a secure element) containing a payment application, subscriber identity module (SIM) or universal subscriber identity module (USIM) applications and files in the user computing entity 110A. In this example, the chip soldered to the motherboard of the user computing entity 110A constitutes an eSE.

IV. Exemplary System Features

The digital business management system 130 provides for, among other things, the following: a network of trusted and verified businesses, a single-system providing sales and supply-chain management capabilities, comprehensive data history, immutable record keeping, business reputation scoring, a token payment infrastructure, and a secure ledger system. The sales and supply-chain management capabilities of certain embodiments include, for example: building a webpage and uploading product information; adding products to various sales channels, managing products advertised via the various sales channels, scheduling orders and shipments and monitoring returns; managing purchase orders, bulk orders, and multimodal shipments; processing transactions by credit card, purchase orders, or financing; conducting search engine marketing; and reviewing sales and marketing analytics.

A. Exemplary Data Flow for Adding Products

Figure 5:
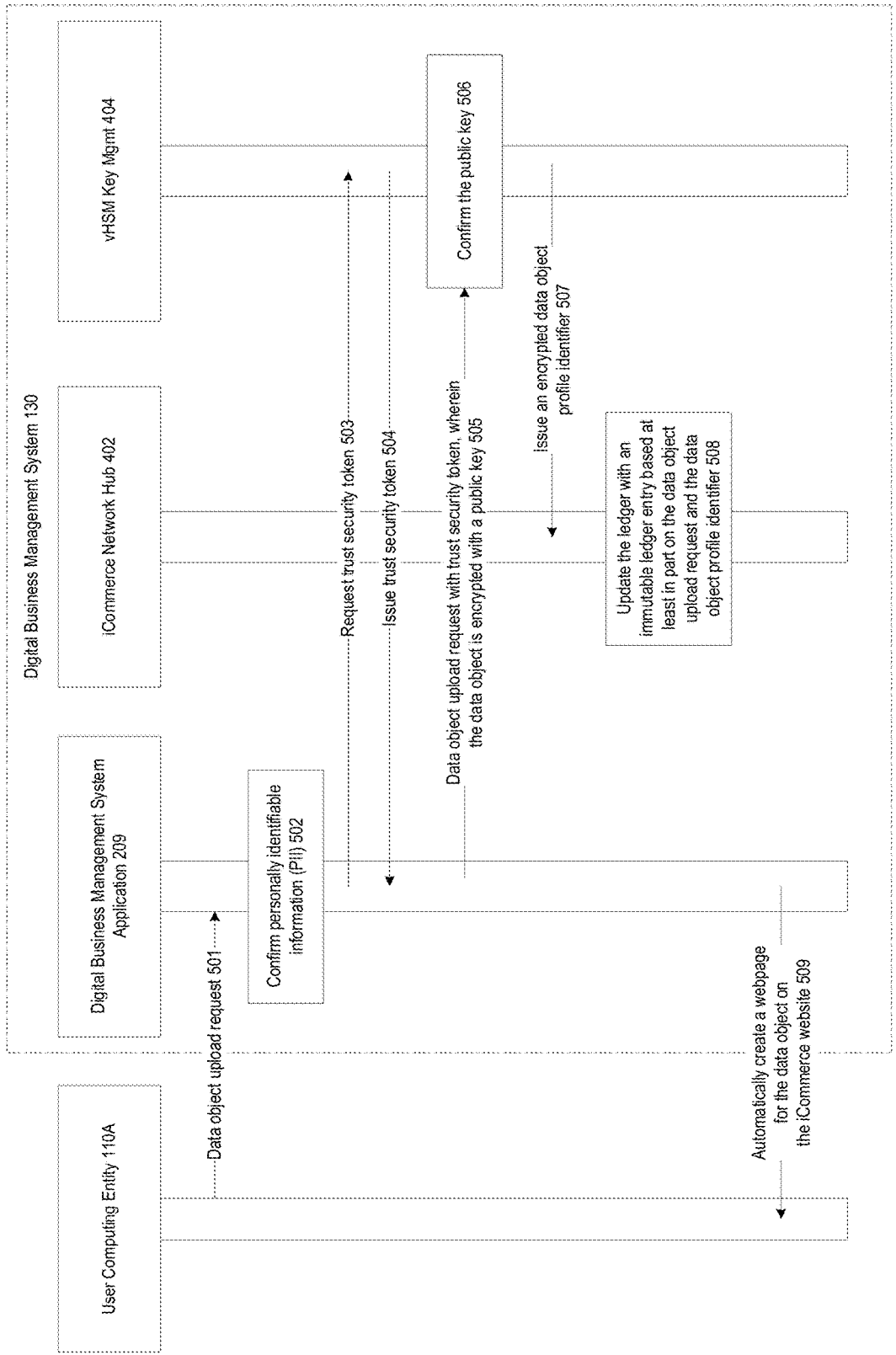
FIG. 5 illustrates schematic views of data transmissions between a user computing entity and a system, according to embodiments discussed herein.

FIG. 5 illustrates various interactions between the user computing entity 110A, the digital business management system application 209, the iCommerce network hub 402, and the vHSM key management 404. The interactions serve to support adding data objects (e.g., product data objects representative of various products offered by a business entity) to the digital business management system 130.

The process 500 illustrates example operations performed by the digital business management system 130 for adding one or more product data objects to the ledger database 150 (relevant to one or more products offered by a business entity) and automatically creating and/or populating a webpage comprising various aspects of the one or more product data objects for the product on the industrial iCommerce website 410 that may be accessible to one or more prospective customers (e.g., who may have access to the industrial iCommerce website 410 through authenticated access to the website based at least in part on data provided and stored within a user profile associated with the prospective customers). The process 500 starts at step 501 where the digital business management system application 209 receives a data object upload request from the user computing entity 110A. In some embodiments, the digital business management system 130 provides an interface for receiving the data object upload request (e.g., properties of the product data object in the form of user input). For example, the interface may include a user input option (e.g., drop-down box) to identify the product data object type (e.g., product or service) and a combination of data fields to enter the product data object name, price, description, shipping details, country of origin, promotions, internal notes, and/or an internal product ID (identification). After the user submits the product data object information, the digital business management system 130 generates a new file with a .csv (comma separated values) file extension comprising the product data object information. Alternatively, the user may import a current .csv file from an existing platform associated with an external commerce channel 120A.

Figure 7:
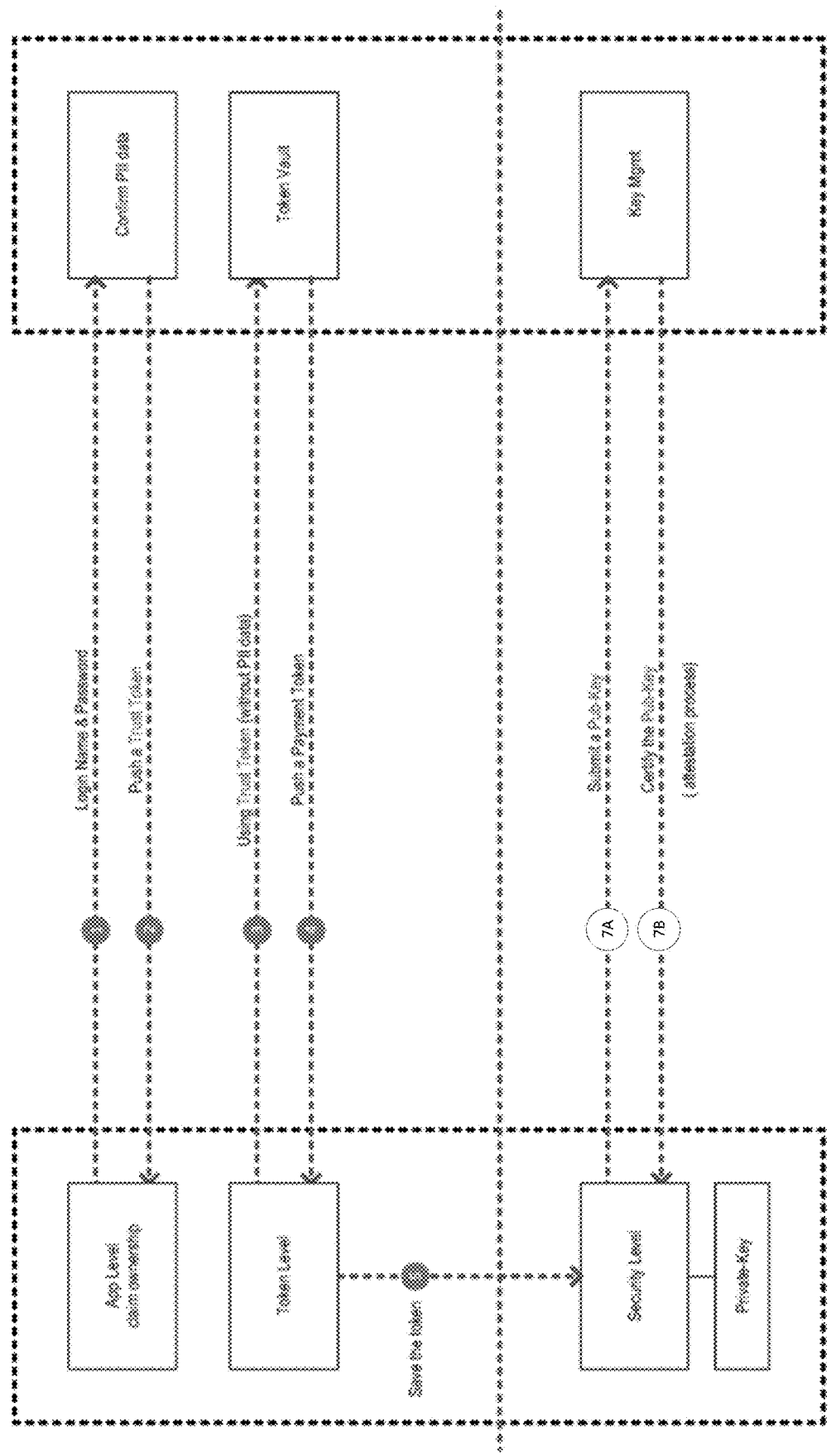

In some embodiments, the digital business management system 130 issues user computing entity 110A a security identification token (e.g., trust security token or other authentication credential) for use in the blockchain based ledger to establish a trusted history of the B2B user's transactions. In this case, the digital business management server 140 provides the digital business management system application 209 and upon activation of the digital business management system application 209 by the user of the user computing entity 110A, provides a login interface that facilitates entering a valid username and password. As shown in FIG. 7, step 1, the username/login name and password are transmitted at the app level to claim ownership to the digital business management server 140 which in turn, authenticates the entered username and password.

Figure 8:
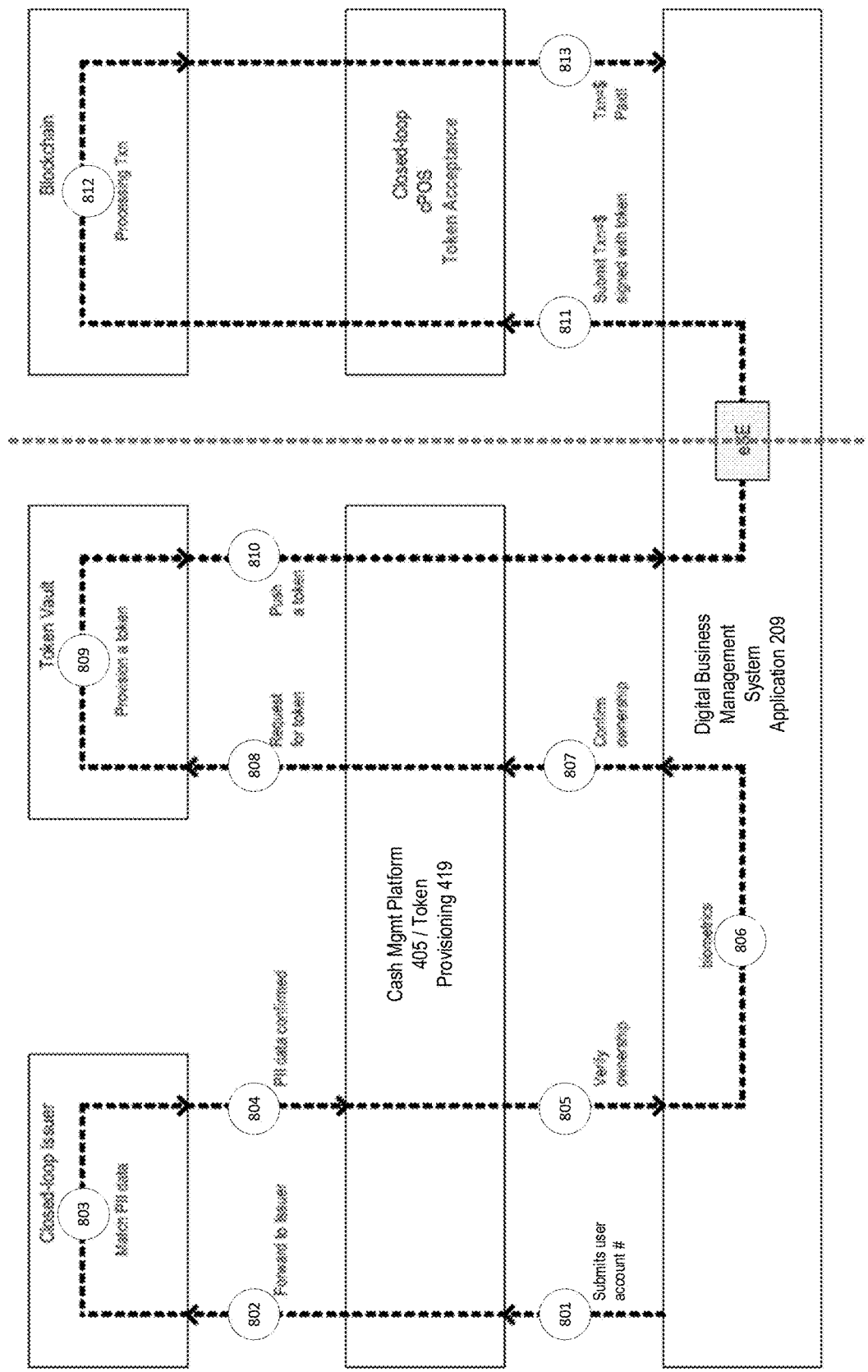

Returning to FIG. 5, step 502, the digital business management system application 209 confirms the personally identifiable information (PII) which is any information used to distinguish or trace the B2B user's identity, such as name, account number, government-issued identification, financial account number, and the like. Accordingly, the digital business management system application 209 may employ an obfuscation method to de-identify potentially personal information. In some embodiments and as shown in FIG. 8, the digital business management system application 209 submits the user account number (#) such as a bank account number, credit account number, or the like, as shown in step 801 to the cash management platform 405 for token provisioning 419. In other words, cash or credit from the B2B user's bank account or credit account is exchanged for payment tokens. As such, the B2B user's account number is forwarded to Issuer (step 802). In step 803 of FIG. 8, the closed-loop issuer matches the PII data against the ledger database 150 and in step 804, the PII data is confirmed and forwarded to the digital business management system application 209 verifying ownership (step 805).

In some embodiments and to ensure a higher degree of confidence that the user is the real account holder, the digital business management system application 209 may request biometrics or biometric data (e.g., a fingerprint, retinal scan, or the like) of the user operating the user computing entity 110A (step 806). In some embodiments, the user computing entity 110A may be equipped with a biometric scanner to facilitate one or more of iris scanning, retinal scanning, or fingerprint scanning capabilities. For example, the user may, for example, provide his or her thumb fingerprint when requested by the digital business management application 209 to initiate provision of payment tokens. At step 807, the digital business management system application 209 may confirm ownership by determining that the previously registered biometric data matches the biometric data received by the user operating the user computing entity 110A.

Returning to FIG. 5, after the user is authenticated, the digital business management system application 209 may request a trust security token from the vHSM key management 404 as shown in step 503. In response, the vHSM key management 404 may issue the trust security token to the digital business management system application 209 as shown in step 504. Pushing the trust token to the app level to claim ownership is also shown in FIG. 7, step 2. In step 505 of FIG. 5, the digital business management system application 209 may transmit the data object upload request with the trust security token, wherein the data object is encrypted with a public key associated with the user.

Figure 6:
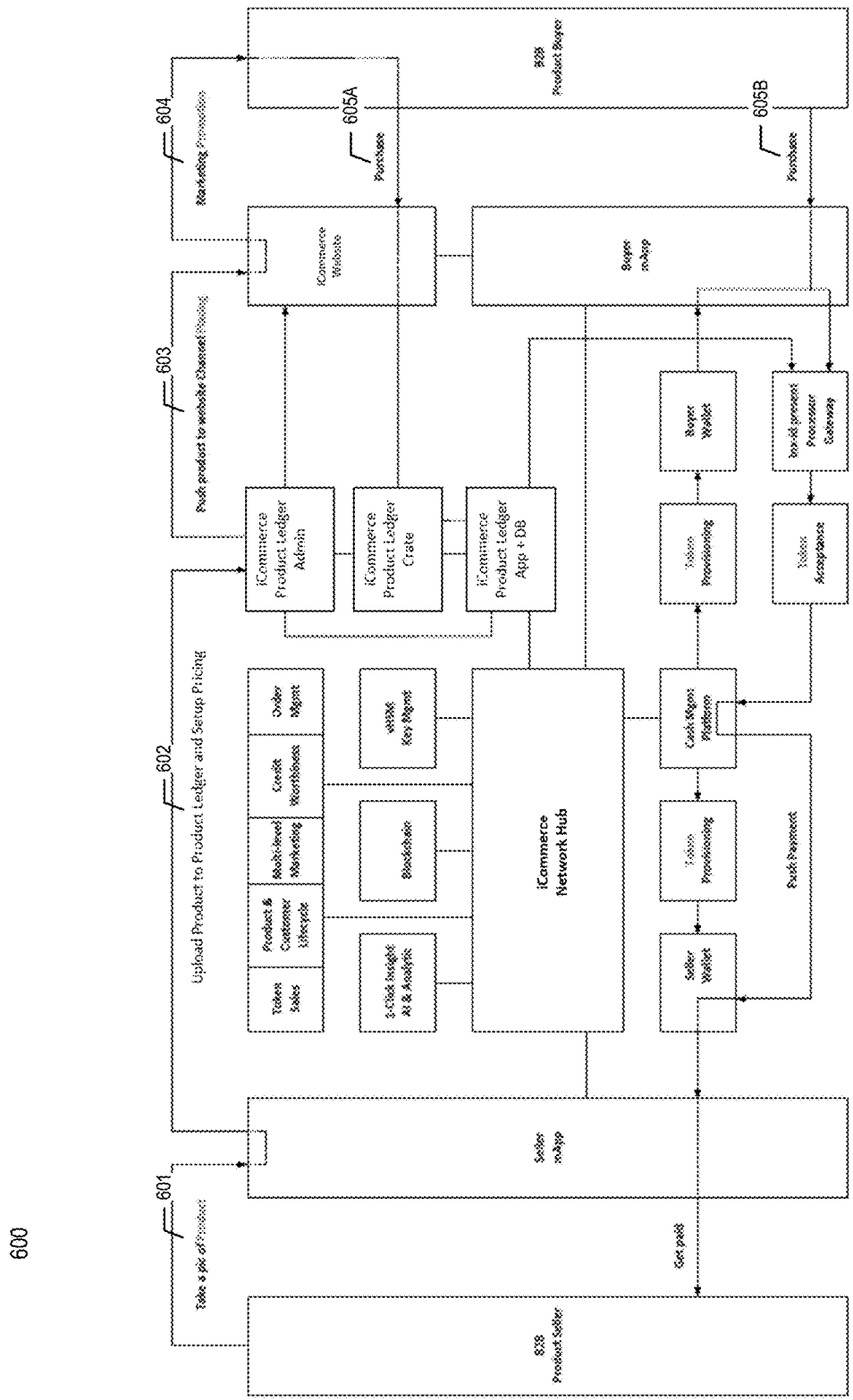
FIGS. 6, 7, 8, and 9 illustrate exemplary operation sequence diagrams in accordance with some embodiments discussed herein.

In some embodiments, the data object upload request comprises taking a picture of the product as shown in step 601 of process 600 of FIG. 6. As shown in FIG. 6, the digital business management system 130 provides product setup, pricing, and storage. In some examples, the digital business management system 130 is configured to provide a seller app for the B2B product seller to upload, for example, a new product for purchase via the industrial iCommerce website 410. In some embodiments, the digital business management system 130 provides an interface for receiving a new product via a data object upload request (e.g., properties of the product data object in the form of user input). For example, the interface may include a user input option (e.g., drop-down box) to identify the new product data object type (e.g., product or service) and a combination of data fields to enter the product data object name, price, description, shipping details, country of origin, promotions, internal notes, and/or an internal product ID (identification). After the B2B product seller submits the new product data object information, the digital business management system 130 generates a new file with a .csv (comma separated values) file extension comprising the product data object information. Alternatively, the user may import a current .csv file from an existing platform associated with an external commerce channel 120A.

B. System Provided Services Related to Products

As shown in FIG. 6, once the product is uploaded by the B2B product seller, the digital business management system 130 provides, via one or more modules, services related to product analytics, blockchain storage, and key management encryption. As noted herein, one-click insight artificial intelligence and analytics comprises leveraging personalized content for use in marketing. For example, once a new product is uploaded, the product analytics service module begins to gather data on buyer interactions—what other products are the buyers looking at, whether the product has been added to the buyer's shopping carts, or any behavioral insights.

Moreover, as mentioned herein, the digital business management system 130 may be further configured for blockchain verification of the product to extract an encrypted data object profile identifier to verify that the identifier is associated with a transaction recorded blockchain, to determine based on additional verification process steps that the product associated with the data object profile identifier is authentic and is owned by the B2B user. The data object profile identifier and the associated product data object are stored in an immutable ledger structure (e.g., blockchain data structure) that records transactions related to the product. In some embodiments, the data object profile identifier used for blockchain transactions are created through cryptography such as, for example, public key cryptography. For example, the relationship between a private key and a public key can be used to authenticate or provide proof that the B2B user is associated with a created transaction. (e.g., adding a promotion to a product). These data object profile identifiers are used to generate and transmit blockchain transactions to an immutable ledger for verification thereon.

Additionally, the digital business management system 130 may provide a plurality of service modules related to token sales, product and customer lifecycle, multi-level marketing, credit worthiness, and order management as shown in FIG. 6. In an example embodiment, the digital business management system 130 further provides product promotion and marketing. Once a purchase of the product is initiated, the digital business management system 130 may provide a secure communication infrastructure for the buyer and seller to generate a contract and negotiate price as well as provide a token payment structure via an electronic wallet as further discussed herein. The layers of security tied to the digital business management system 130 establish closed-loop transactions, and the emergence of mobile payments also allows for biometrics, such as fingerprints, to make sure that identities, transactions and the terms of those transactions are all safeguarded.

After the digital business management system application 209 transmits the data object upload request with the trust security token as shown in step 505 of FIG. 5, the process continues with step 506 where the vHSM key management 404 is configured to confirm the public key by determining that the public key corresponds to a private key stored on the vHSM key management 404. The vHSM key management 404 verifies that the private key is associated with the B2B user and the ledger and transmits a signed confirmation certificate to the B2B user. The ownership of the private key implies that the B2B user can spend the payment token which is associated with a specific address of the product ledger. Any action such as, for example, purchasing, exchanging, or conducting a transaction is digitally signed by the B2B user using the private key. Without the private key, the payment token cannot be signed and therefore no transaction may take place. These transactions are recorded in the product ledger of the digital business management system 130.

This process is also shown in FIG. 7, where in step 7A, a public key is submitted at the security level of the digital business management system application 209 and in response the public key is certified (after verification) as shown in step 7B. In other words, an attestation process is implemented for proving that the user computing entity 110A is trustworthy and has not been breached. The attestation process refers to cryptographically proving the source of a key as being (e.g. is stored in) the user computing entity 110A. Upon certifying the public key, a private key is acquired as shown in FIG. 7. This is also shown in FIG. 6, step 507, where the vHSM key management 404 issues an encrypted data object profile identifier to the iCommerce network hub 402. In step 508, the iCommerce network hub 402 may then update the ledger with an immutable ledger entry based at least in part on the data object upload request and the data object profile identifier (e.g., step 602 of FIG. 6: upload product to product ledger and setup pricing). In step 509 of FIG. 5, the digital business management system application 209 is then configured to automatically create a webpage for the data object on the iCommerce website.

In some embodiments, automatically creating a webpage comprises pushing data corresponding with the product to the website (e.g., industrial iCommerce website 410) and channel placing (e.g., updating eBay™ storefront with new product) as shown by step 603 of FIG. 6. For example, the digital business management system application 209 may provide website structural components that the website is comprised of such as WordPress plugins, web builders, wikis, content management systems, and the like. After creating the webpage, the digital business management system application 209 can provide means for automatically adding the product data object to the webpage and the product ledger. Additionally, as shown in step 604 of FIG. 6, uploading the product may include generation of a marketing promotion (e.g., sending targeted promotions, coupons and offers for the product to particular users).

C. Purchase Transaction Event

FIG. 6 further illustrates the product purchasing process. In some embodiments, the B2B product buyer purchases the product via a buyer mApp as depicted in steps 605A and 605B using a B2B wallet (e.g., digital wallets, eWallets, etc.). In some embodiments, the B2B wallet can be embodied as software configured to be stored and executable via a B2B user's smart phone and configured for executing a purchase electronically. In an example embodiment, the digital business management system 130 receives a purchase transaction event identifying one or more products for purchase via corresponding data object profile identifier(s). The purchase transaction comprises information related to the purchase details (e.g., price, quantity, promotions applied, etc.) and payment details (e.g., payment token associated with the B2B product buyer). The digital business management system processes the purchase transaction event once the payment details are approved and verified. The purchase transaction event is recorded by the blockchain ledger using the associated data object profile identifier.

In some embodiments, the digital business management system 130 accesses the ledger database 150 for the particular data object using the data object profile identifier. Additionally, the digital business management system 130 accesses the ledger database 150 for the particular data object using the B2B user's profile identifier. The digital business management system 130 can then identify the one or more master metadata tags stored in the ledger and associated with the particular data object. The ledger is updated with the purchase transaction event. For example, the ledger includes information that the product associated with the product data object was purchased for a particular amount and quantity. Information related to any promotions and marketing characteristics activated at the time of the purchase transaction event is also recorded to the ledger. Additionally, information related to who purchased the product (e.g., B2B product buyer) is also recorded to the ledger.

D. Token Payment Process

Figure 9:
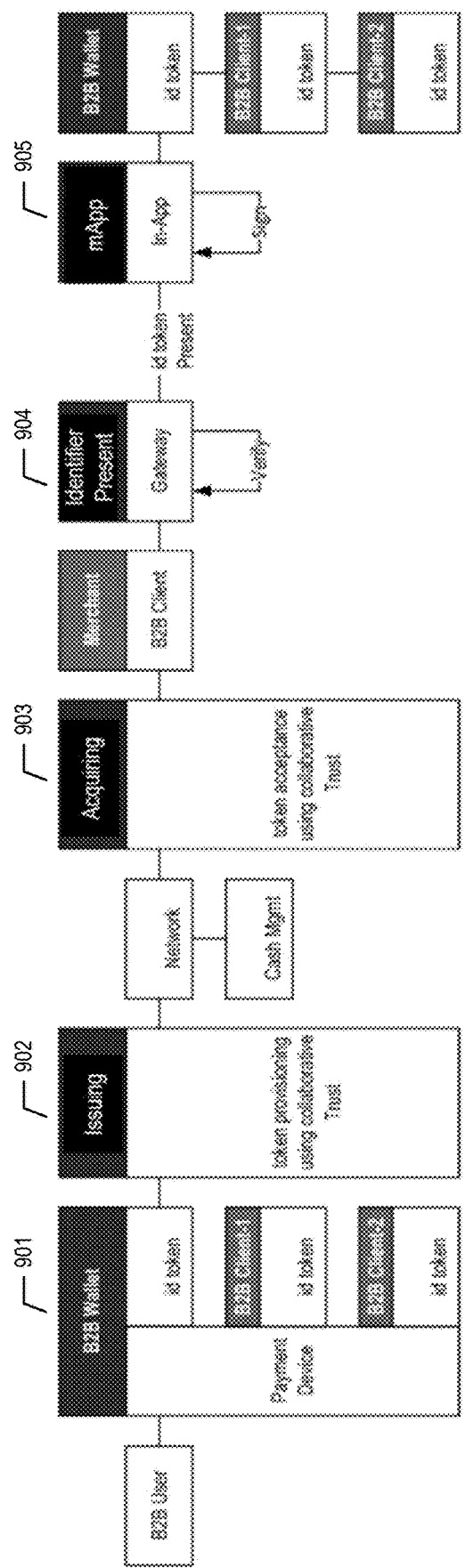

FIG. 9 illustrates a B2B wallet payment process 900. B2B wallet 901 is associated with at least two clients (e.g., businesses) each with their own id token (e.g., security token) used to authenticate the client. When executing a purchase using B2B wallet 901 with the digital business management system 130, the digital business management system 130 implements a token provisioning process using collaborative trust 902. Example process steps in the token provisioning process using collaborative trust 902 include steps 801-810 of FIG. 8. In such embodiments, collaborative trust refers to using a decentralized, immutable, and transparent ledger for all B2B transactions. The ledger serves as a spreadsheet of all iCommerce B2B transactions. With a decentralized ledger, there is no one entity/server system that monitors iCommerce B2B accounts, and instead there are a plurality of computing entities independently track of all the transactions. The plurality of computing entities communicate with each other to ensure that they all have recorded the same transactions and made the same conclusions. No one single computer is capable of storing manipulates data within the decentralized ledger for the gain of the computer owner, the other "nodes" or computers in the collaborative trust system would not validate the manipulated data, and thus would not be stored within the decentralized ledger. Using said collaborative trust, embodiments of the B2B collaborative industrial internet e-commerce marketplace infrastructure can verify the B2B user so that the B2B user can securely submit transactions, access and/or update the ledger, etc. As a result, the B2B collaborative industrial internet e-commerce marketplace infrastructure authenticates and validates the trustworthiness of a given B2B user.

Returning to FIG. 9, the digital business management system 130 implements the token acceptance process using collaborative trust 903. Steps included in embodiments of the token acceptance process using collaborative trust 903 is shown in FIG. 8, wherein step 808 includes requesting a token, step 809 includes provisioning a token, and step 810 includes pushing a token. Using the eSE, the digital business management system application 209 submits a transaction payment signed with security token. See step 811 of FIG. 8. This step is similar to steps 3 and 4 of FIG. 7 of using a trust token (e.g., security token) without PII data; and pushing the payment token from the token vault. The token vault stores payment tokens.

Returning to FIG. 8, step 812 includes processing the transaction using blockchain. For example, the digital business management system 130 adds an entry to the blockchain ledger for the transaction payment submission signed with the security token. To prevent modification of the blockchain ledger entry, the digital business management system 130 may require a cryptographic hash of the previous block combined with the current block to prevent changes to the blockchain ledger.

In step 813, the block is a record that confirms that the transaction has been paid (e.g., the transaction payment is stored as part of the blockchain). These steps are similarly shown in FIG. 9. In FIG. 9, the eSE chip is verified as depicted in step 904. The payment token is presented and signed by the digital business management system mApp as depicted in step 905.

Figure 10:
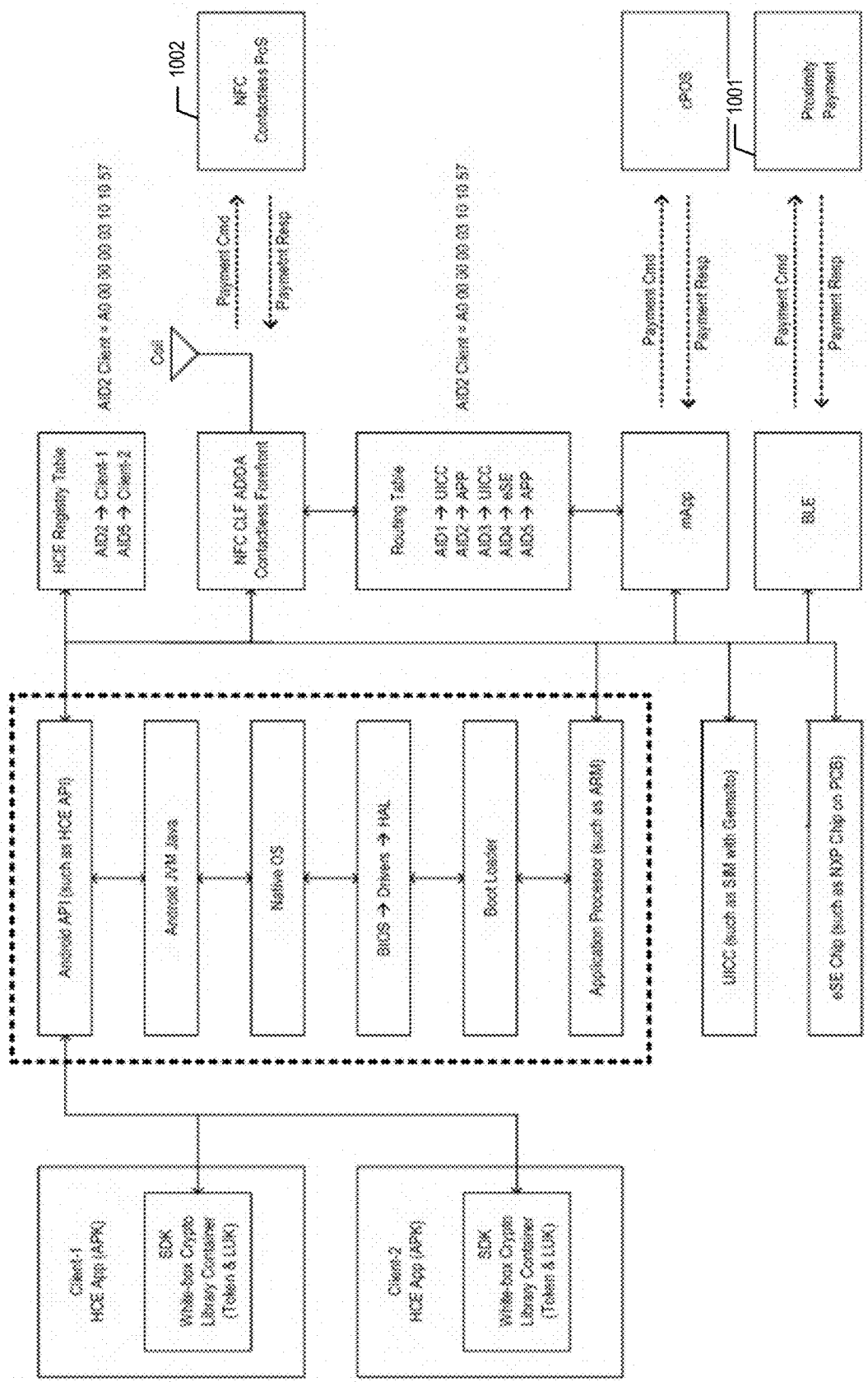
FIG. 10 illustrates a schematic block diagram of circuitry that can be included in a user computing entity and/or server structured in accordance with some embodiments discussed herein.

FIG. 10 schematically shows an exemplary B2B wallet in an mApp environment and the various condition purchase offers (cPos) defining the combination of restrictions for which the digital business management system 130 accepts payment. Example cPos depicted in FIG. 10 include proximity payment 1001 representing a payment protocol for mobile payments over proximity wireless network Bluetooth low energy (BLE). Also, a variety of other Near Field Communication (NFC) contactless purchase offers (PoS) 1002 techniques may be used to determine the presence of the user computing entity 110A.

In some embodiments, the B2B wallet utilizes a blockchain secured token payment structure. By issuing blockchain secured payment tokens, the digital business management system 130 helps B2B users remove costs and friction when using the iCommerce system. For example, payment tokens may be used to facilitate transactions on the iCommerce system. The B2B collaborative industrial internet e-commerce marketplace infrastructure is further configured to enable users to exchange payment tokens for fiat currency (e.g., after completion of a transaction).

E. Exemplary Data Flow for Generating a Ledger Entry for a Transaction

Figure 11:
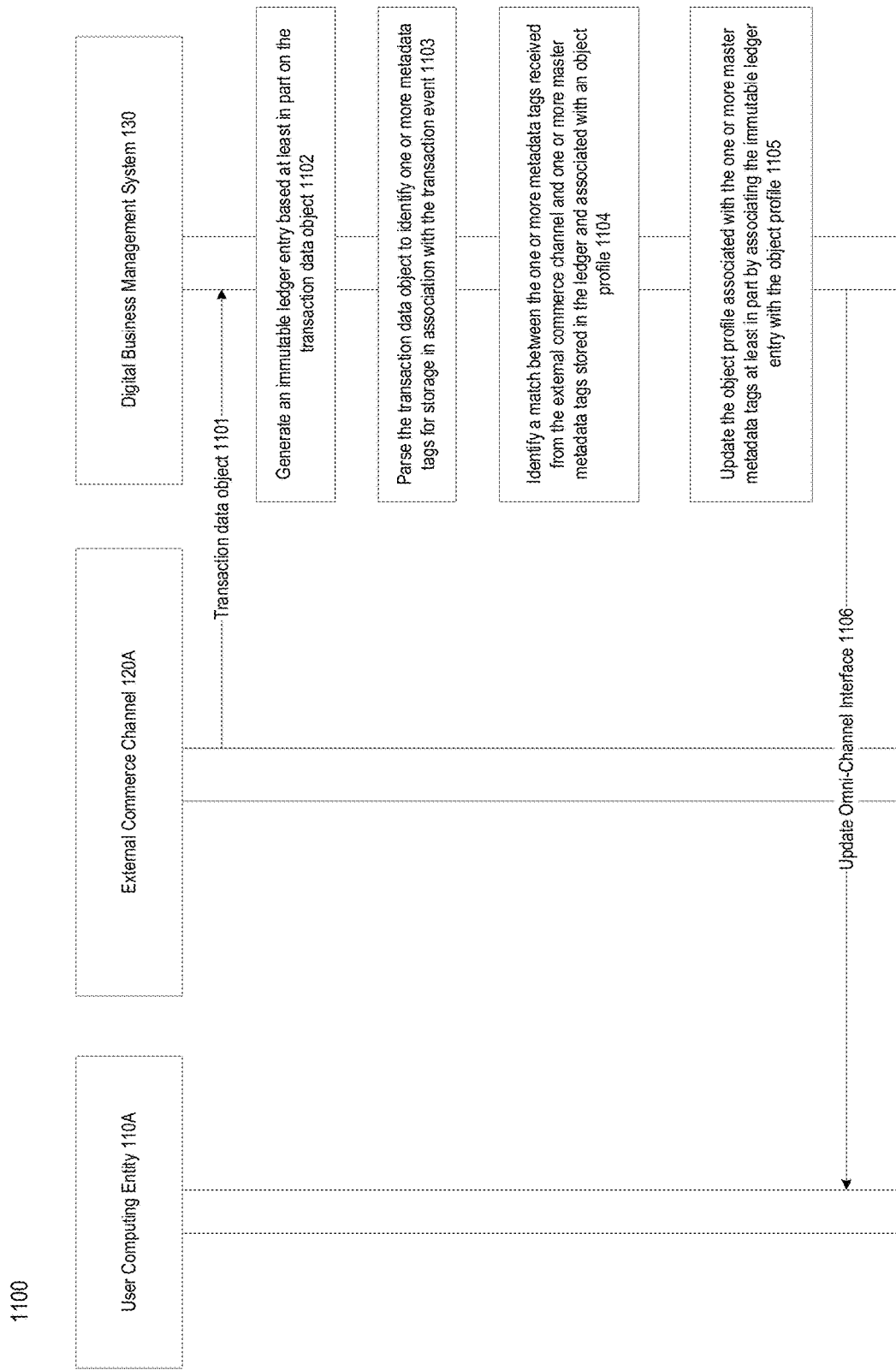
FIG. 11 illustrates schematic views of data transmissions between a user computing entity and a system, according to embodiments discussed herein.

Referring now to FIG. 11, the process 1100 illustrates example operations performed by the digital business management system 130 for generating a ledger entry for a transaction and storing the ledger entry to the ledger database 150. The example process 1100 starts at step 1101, where the digital business management system 130 receives a transaction data object from the external commerce channel 120A. In some embodiments, the transaction data object refers to a data structure or a dataset received from the external commerce channel 120A to the digital business management system 130 for representing a product transaction event (e.g., buying, selling, trading redeeming, etc.). The transaction data object comprises a product identifier and metadata tags. In some embodiments, the external commerce channel operates on a compiled code base or repository that is separate and distinct from that which supports the digital business management system 130.

The digital business management system 130 generates an immutable ledger entry based at least in part on the transaction data object as shown in step 1102. In this case, the transaction data object includes an identifier of the transaction (e.g., product identifier, account identifier, etc.). The identifier is a unique identifier sent in the transaction event and attributed to the transaction event. The digital business management system 130 records details of the transaction as an immutable ledger entry (e.g., block of the blockchain). In an example embodiment, the digital business management system 130 provides blockchain security and ledger services that provides encryption of records, with different blockchain identity keys that allow blockchain hashing and verification. Data may not be viewable without a blockchain identity key. In step 1103, the digital business management system 130 parses the transaction data object to identify one or more metadata tags for storage in association with the transaction event. In an example embodiment, the digital business management system 130 can standardize the transaction data object into a format recognizable and/or compatible with a data object profile of the digital business management system 130.

In some embodiments, the digital business management system 130 is configured to provide an API usable by the external commerce channel 120A to provide data (e.g., product updates) that may be stored within the ledger. Such updates are provided as transaction data objects, which may be provided immediately in response to some change (e.g., purchase order is created in the external commerce channel 120A) or batched and provided at defined intervals (e.g., hourly, nightly, etc.). These updates are identified by their associated transaction data object identifier.

The digital business management system 130 is then configured to parse the transaction data object to identify one or more metadata tags for storage in association with a transaction event. For example, the metadata tags may comprise inventory information, order information, order date and time information, buyer information, or one or more predefined metadata fields. In step 1104, the digital business management system 130 identifies a match between the one or more metadata tags received from the external commerce channel and one or more master metadata tags stored in the ledger and associated with an object profile. The one or more master metadata tags refers to a set of master metadata records that represent a most accurate and complete set of metadata for a particular product represented within stored data objects within the digital business management system 130. The one or more master metadata tags may be stored in the ledger database 150 and may be accessible by the digital business management system 130.

In step 1105, the digital business management system 130 is configured to update the object profile associated with the one or more master metadata tags at least in part by associating the immutable ledger entry with the object profile. In some embodiments, the object profile refers to information associated with a particular product, including for example, an object profile identifier, one or more businesses/B2B users with which the object profile is managed/owned, one or more businesses/B2B users with which the object profile has been granted access to, and the like.

Figure 13:
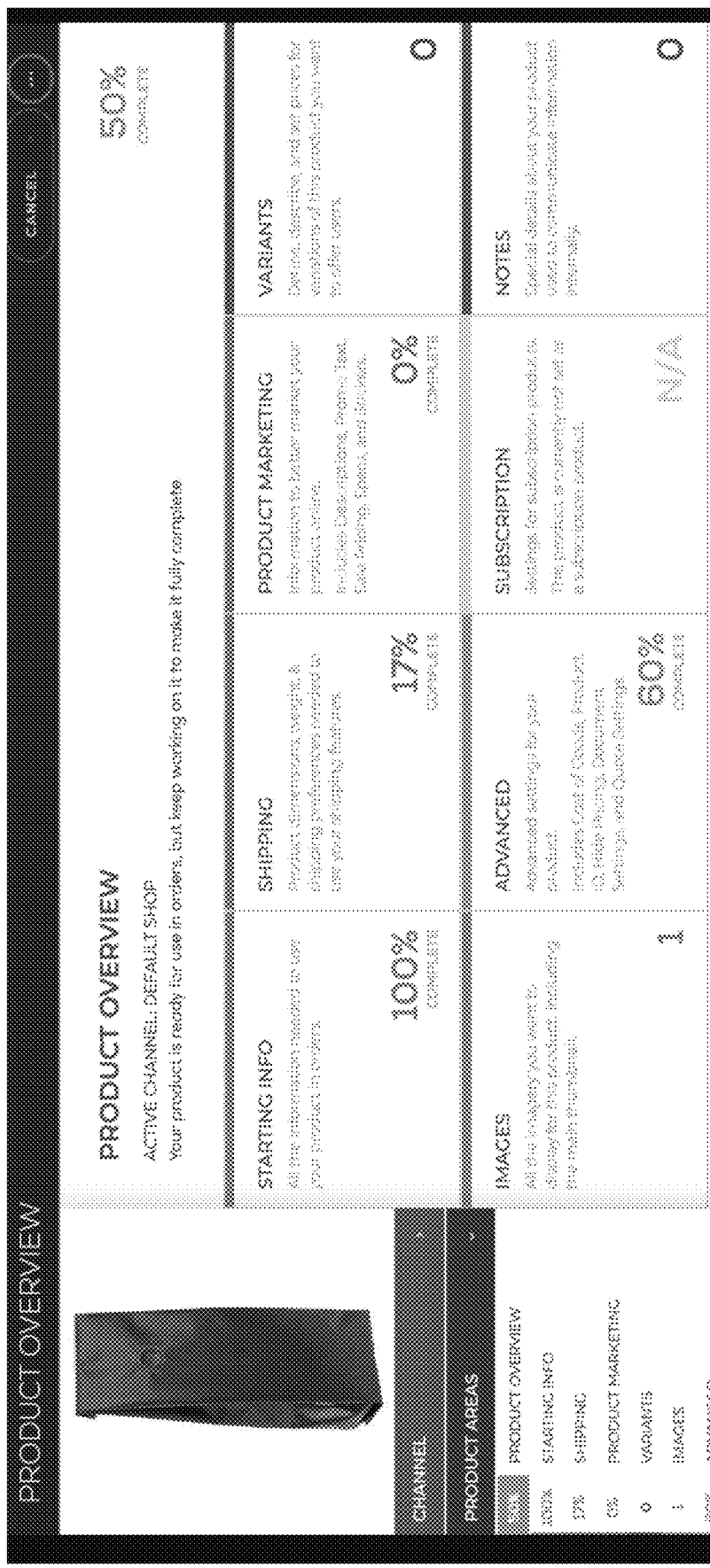
FIGS. 13, 14, and 15 illustrate example graphical user interfaces in accordance with some embodiments discussed herein.
Figure 14:
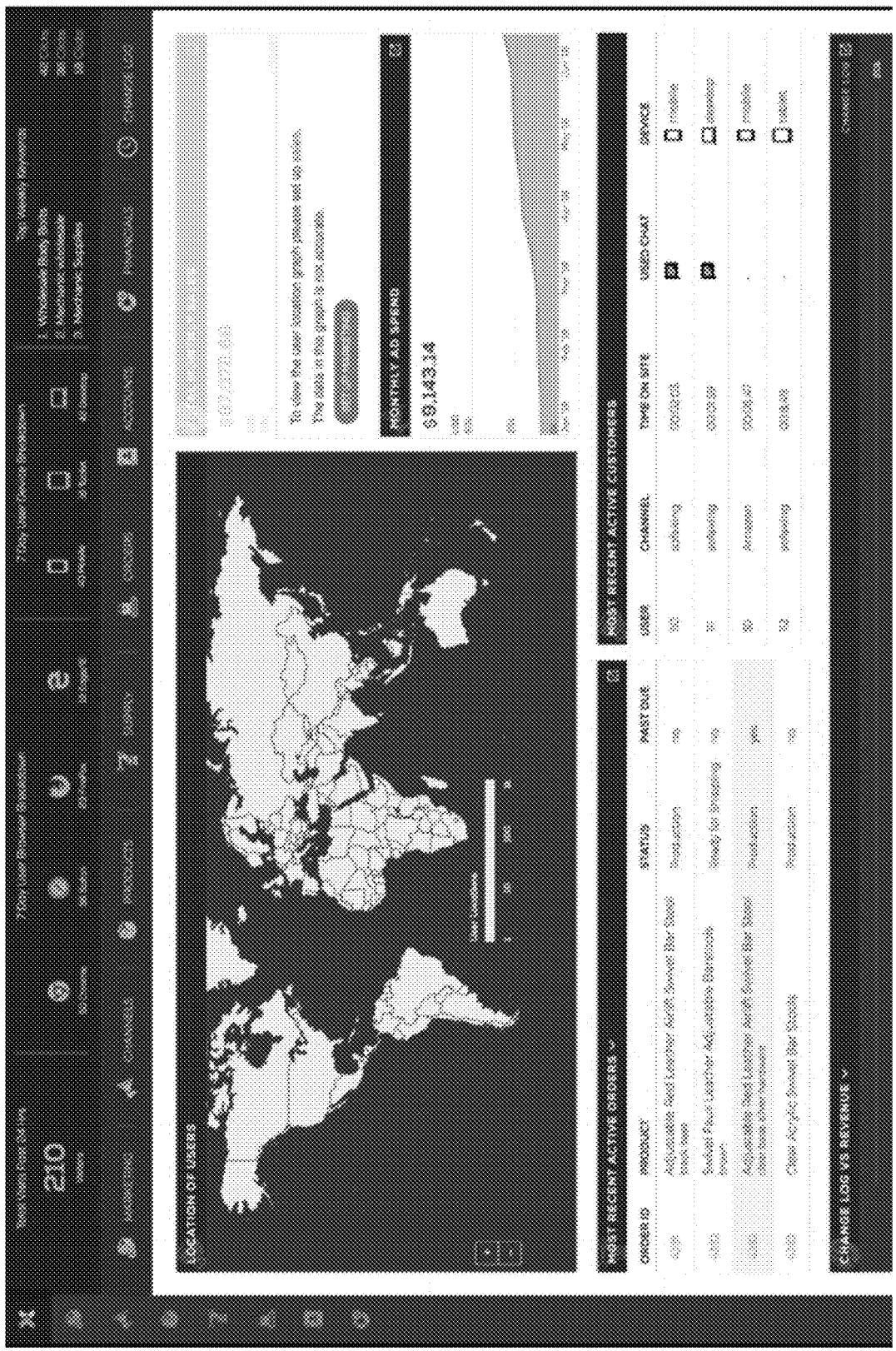

In step 1106, the digital business management system 130 is configured to update a portion of the omni-channel interface 1106 based at least in part on the updated object profile. The portion of the omni-channel interface 1106 is a product-specific portion. For example, the omni-channel interface 1106 may be updated to display an accurate inventory account, a new promotion, the transaction event associated with the transaction object, and the like. FIG. 13 shows an example omni-channel interface comprising a product overview of a particular product. FIG. 14 shows another example omni-channel interface comprising a detailed view of all the products managed by a business. In particular, FIG. 14 displays detailed information on all active orders and active customers, as well as total sales for the month and advertisement spend.

Figure 15:
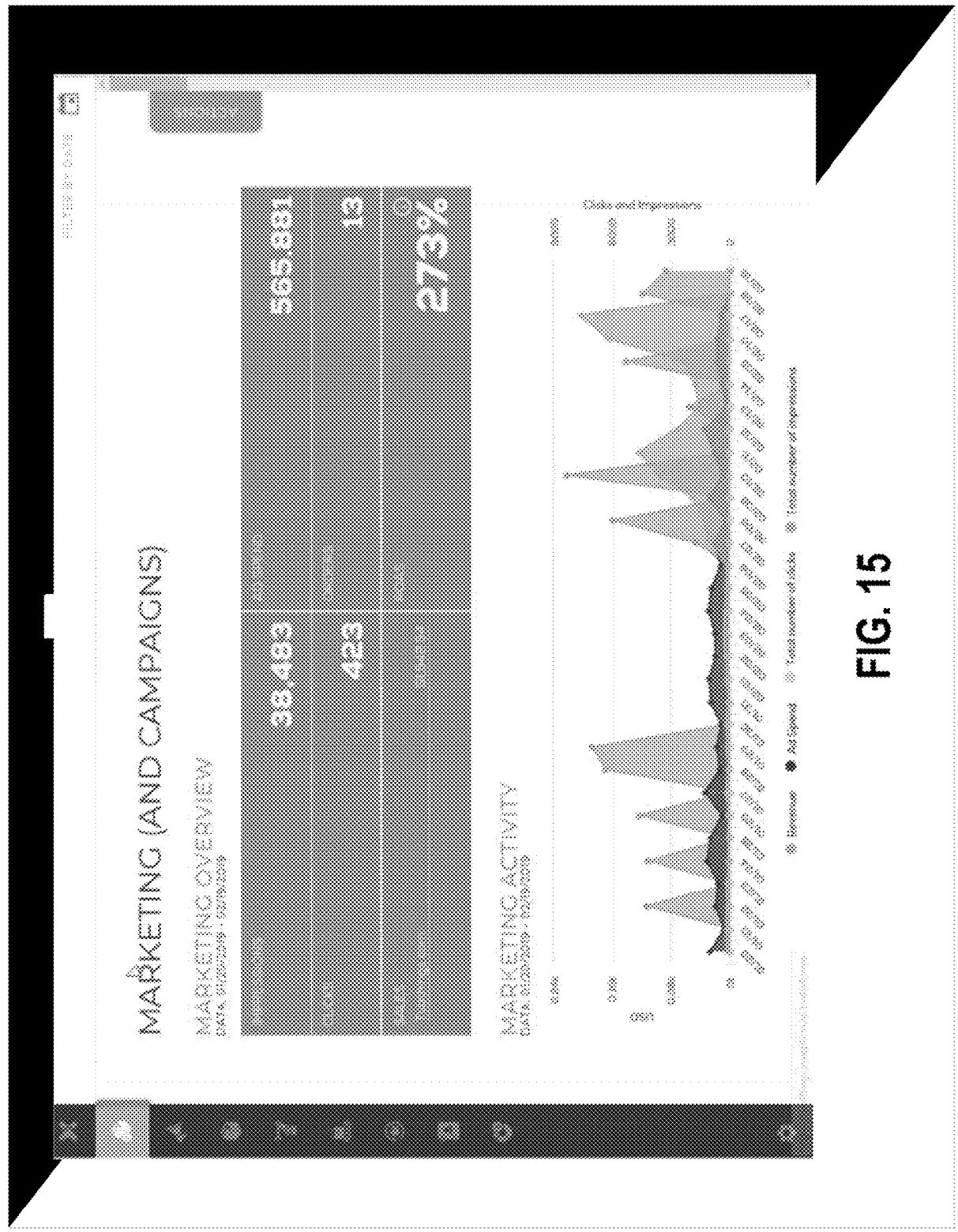

In some embodiments, there is an omni-channel interface for each and every product such that the digital business management system 130 updates the product-specific omni channel interface based on the updated data object profile. The updates are reflective of transaction events occurring via any of a variety of the external commerce channels 121A-121N. In an example embodiment, the updates may be indicative of the specific external commerce channel that the update came from (e.g., transaction X occurred via eBay™). In an example embodiment, when the user navigates to the advertisement spend section of FIG. 14, the digital business management system 130 may be configured to provide a more detailed overview of the advertisement spend as shown by FIG. 15. FIG. 15 displays not only advertisement spend but also customer activity such as impressions (e.g., advertisement view) and advertisement clicks.

The digital business management system 130 may further be configured to provide, among other things, the following: real-time analytics of sales; a competitive analysis of comparable B2B users; an online product catalog; marketing of products; a mobile app platform or other web interface to enable B2B users to upload, update, promote, and store product information; a pre-paid token payment structure; and comprehensive transaction and artifact history.

F. Exemplary Data Flow for Generating a Loan Business Plan

Figure 16:
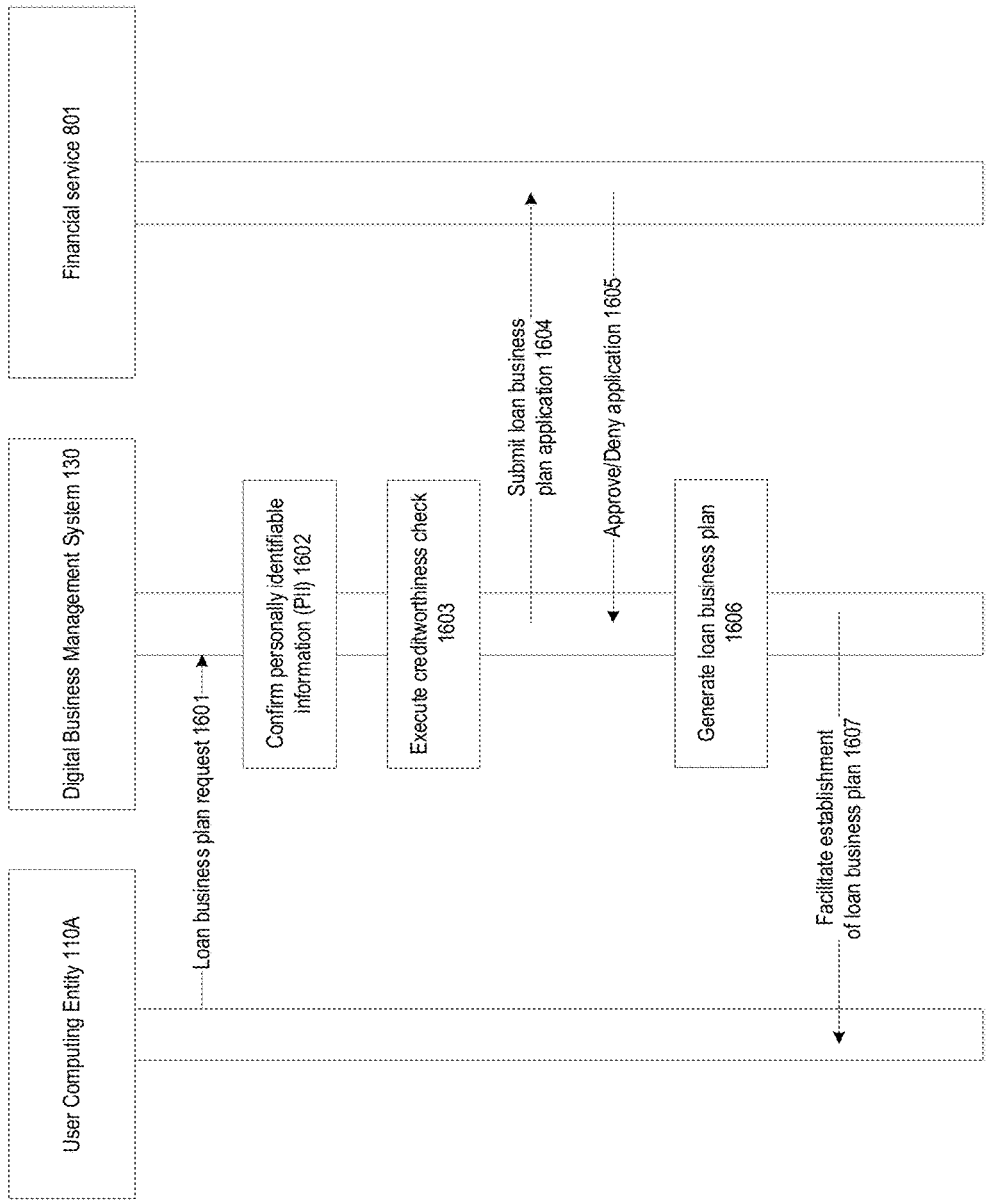
FIG. 16 illustrates schematic views of data transmissions between a user computing entity and a system, according to embodiments discussed herein.

Referring now to FIG. 16, the process 1600 illustrates example operations performed by the digital business management system 130 for generating a loan business plan. The example process 1600 starts at step 1601, where the digital business management system 130 receives a loan business plan request from the user computing entity 110A. In step 1602, the digital business management system 130 confirms PII of the user of the user computing entity 110A. For example, the digital business management system 130 launches an authentication process as discussed in reference to FIG. 8 to verify the identity of the user (e.g., loan requester or persons acting on behalf of the loan requester).

Once the user is verified, the digital business management system 130 executes a creditworthiness check as shown in step 1603. Executing a creditworthiness check comprises compiling transaction data from the ledger database 150 associated with the loan requester and transmitting the compiled transaction data to a financial service 801, which may be configured to perform financial analyses based at least in part on the retrieved transaction data. For example, the digital business management system 130 may be configured to query the ledger database 150 based on relevant identifier data to identify representative transactions having metadata matching the relevant identifier data. In response to the query, the digital business management system 130 may receive data relevant to the described transactions.

However, it should be understood that the financial analyses may be performed via one or more machine learning models, which may be trained with a training data set comprising historical data indicative of various transaction data as well as financial results of providing a loan to individuals associated with the transaction data. The output of the resulting machine-learning model may be a score indicative of a determined creditworthiness of a particular individual, and this score may be correlated (e.g., through a rule-based engine) to one or more loan term packages (e.g., each loan term package encompassing data indicative of terms for approval of loans, such as a loan interest rate, a maximum loan amount, a required loan collateral amount, and/or the like), such that particular score ranges may be correlated with different loan term packages. As depicted in step 1604, the digital business management system 130 submits a loan business plan application to the financial service 801. In response, the financial service 801 approves or declines the application as shown in step 1605. If the application is approved, the digital business management system 130 generates a loan business plan as shown in step 1606. The loan business plan is based on the user's creditworthiness as determined by the transaction data from the ledger database 150. In step 1607, the digital business management system 130 may be configured to facilitate establishment of the loan business plan. For example, the digital business management system 130 may generate alerts or notifications when payments are due and/or when credits are issued.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this description. Although specific terms are employed herein, they are used in a generic and descriptive sense only and not for purposes of limitation.

The invention claimed is:

1. A system comprising:
a non-transitory computer readable storage medium storing a copy of a decentralized blockchain, the decentralized blockchain being maintained at a plurality of computing devices;
and one or more processors, configured to, with the non-transitory computer readable storage medium:
receive, at a network hub and via a communication application program interface of a third-party application, a transaction dataset for a transaction performed using the third-party application, wherein the transaction dataset for the transaction comprises one or more metadata tags classifying the transaction and a transaction price for an item exchanged as part of the transaction;
convert the transaction price into a payment token amount that is payable via payment tokens that are usable as surrogate payment data for fiat currency;
generate a first block of the decentralized blockchain to include the transaction dataset for the transaction, wherein the first block, after being generated, is immutable;
receive, at the network hub, a security token from an embedded-secure element (eSE) of a client device engaged with the third-party application;
in response to authentication of the security token at the decentralized blockchain:
transfer, via the blockchain from a first digital wallet associated with the client device to a second digital wallet, one or more blockchain-secured payment tokens in the payment token amount, and
generate, by the network hub at the decentralized blockchain, a second block of the decentralized blockchain to include a record of the transfer of the one or more blockchain-secured payment tokens from the first digital wallet to the second digital wallet; and
facilitate exchange of the transferred one or more blockchain-secured payment tokens into fiat currency after completion of the transaction.

2. The system of claim 1, wherein the one or more processors are further configured to, with the non-transitory computer readable storage medium:
standardize the transaction dataset into a format compatible with a profile that includes a transaction history of previous transactions performed using the third-party application and/or one or more additional third-party applications.

3. The system of claim 1, wherein the one or more processors are further configured to, with the non-transitory computer readable storage medium:
subscribe to the communication application program interface of the third-party application to receive transaction data updates.

4. The system of claim 1, wherein the one or more metadata tags comprise product inventory information, product order information, order date and time information, or buyer information.

5. The system of claim 1, wherein the third-party application operates on a compiled code base or repository that is separate and distinct from that which supports the system.

6. A computer-implemented method comprising:
providing a decentralized blockchain maintained at a plurality of computing devices;
receiving, at a network hub and via a communication application program interface of a third-party application, a transaction dataset for a transaction performed using the third-party application, wherein the transaction dataset for the transaction comprises one or more metadata tags classifying the transaction and a transaction price for an item exchanged as part of the transaction;
converting the transaction price into a payment token amount that is payable via payment tokens that are usable as surrogate payment data for fiat currency;
generating a first block of the decentralized blockchain, to include the transaction dataset for the transaction, wherein the first block, after being generated, is immutable;
receiving, at the network hub, a security token from an embedded-secure element (eSE) of a client device engaged with the third-party application;
in response to authenticating the security token at the decentralized blockchain:
transferring, via the blockchain from a first digital wallet associated with the client device to a second digital wallet, one or more blockchain-secured payment tokens in the payment token amount, and
generating, by the network hub at the decentralized blockchain, a second block of the decentralized blockchain to include a record of the transfer of the one or more blockchain-secured payment tokens from the first digital wallet to the second digital wallet; and
facilitating exchange of the transferred one or more blockchain-secured payment tokens into fiat currency after completion of the transaction.

7. The computer-implemented method of claim 6, further comprising:
standardizing the transaction dataset into a format compatible with a profile that includes a transaction history of previous transactions performed using the third-party application and/or one or more additional third-party applications.

8. The computer-implemented method of claim 6, further comprising:
subscribing to the communication application program interface of the third-party application to receive transaction data updates.

9. The computer-implemented method of claim 6, wherein the one or more metadata tags comprise product inventory information, product order information, order date and time information, or buyer information.

10. The computer-implemented method of claim 6, wherein the third-party application operates on a compiled code base or repository that is separate and distinct from that which supports the digital business management system.

11. A computer program product comprising:
a non-transitory computer readable medium storing a copy of a decentralized blockchain, the decentralized blockchain being maintained at a plurality of computing devices, wherein the non-transitory computer readable medium further stores computer program instructions, when executed by a processor, cause the processor to:
receive, at a network hub and via a communication application program interface of a third-party application, a transaction dataset for a transaction performed using the third-party application, wherein the transaction dataset for the transaction comprises one or more metadata tags classifying the transaction and a transaction price for an item exchanged as part of the transaction;
convert the transaction price into a payment token amount that is payable via payment tokens that are usable as surrogate payment data for fiat currency;
generate a first block of the decentralized blockchain to include the transaction dataset for the transaction, wherein the first block, after being generated, is immutable;
receive, at the network hub, a security token from an embedded-secure element (eSE) of a client device engaged with the third-party application;
in response to authentication of the security token at the decentralized blockchain:
transfer, via the blockchain from a first digital wallet associated with the client device to a second digital wallet, one or more blockchain-secured payment tokens in the payment token amount, and
generate, by the network hub at the decentralized blockchain, a second block of the decentralized blockchain to include a record of the transfer of the one or more blockchain-secured payment tokens from the first digital wallet to the second digital wallet; and
facilitate exchange of the transferred one or more blockchain-secured payment tokens into fiat currency after completion of the transaction.

12. The computer program product of claim 11, wherein the computer program instructions when executed by a processor, further cause the processor to:
standardize the transaction dataset into a format compatible with a profile that includes a transaction history of previous transactions performed using the third-party application and/or one or more additional third-party applications.

13. The computer program product of claim 11, wherein the computer program instructions when executed by a processor, further cause the processor to:
subscribe to the communication application program interface of the third-party application to receive transaction data object updates.

14. The computer program product of claim 11, wherein the one or more metadata tags comprise product inventory information, product order information, order date and time information, or buyer information.

* * * * *